(12) United States Patent
Fleming et al.

(10) Patent No.: US 6,474,330 B1
(45) Date of Patent: Nov. 5, 2002

(54) HYDROGEN-FUELED VISUAL FLAME GAS FIREPLACE

(76) Inventors: John S. Fleming, 63 Queenstowne Road, Onehunga, Auckland (NZ); Arthur Morris Lister, 49 Grace Church Drive, Auckland (NZ)

( * ) Notice: Subject to any disclaimer, the term of this patent is extended or adjusted under 35 U.S.C. 154(b) by 0 days.

(21) Appl. No.: 09/581,723

(22) PCT Filed: Dec. 21, 1998

(86) PCT No.: PCT/US98/27026

§ 371 (c)(1),
(2), (4) Date: Sep. 21, 2000

(87) PCT Pub. No.: WO99/32832

PCT Pub. Date: Jul. 1, 1999

Related U.S. Application Data

(60) Provisional application No. 60/068,354, filed on Dec. 19, 1997.

(51) Int. Cl.[7] ........................ F23D 14/82; F23D 14/02; F24C 3/04; C25B 1/00; H02M 3/00
(52) U.S. Cl. ........................ 126/512; 431/125; 363/44
(58) Field of Search ................... 126/500, 512, 126/503, 116 R; 363/44, 45, 47, 52, 53, 143, 125, 124; 204/256, 258, 257, 263, 264, 265, 266, 269, 275, 279; 431/125

(56) References Cited

U.S. PATENT DOCUMENTS

| 558,176 | A | | 4/1896 | Huber | |
|---|---|---|---|---|---|
| 1,012,199 | A | | 12/1911 | Greenlee | |
| 2,075,688 | A | * | 3/1937 | Zdansky | |
| 2,098,629 | A | | 11/1937 | Knowlton | ...................... 204/5 |
| 2,157,914 | A | | 5/1939 | Ness | ........................... 48/192 |
| 2,161,700 | A | | 6/1939 | De Motte | .................... 48/192 |
| 2,717,872 | A | * | 9/1955 | Zdansky | |
| 3,222,270 | A | * | 12/1965 | Edwards | |
| 3,262,872 | A | | 7/1966 | Rhodes et al. | .............. 204/272 |
| 3,784,096 | A | | 1/1974 | Zweifel | ...................... 237/1 R |
| 3,913,002 | A | | 10/1975 | Steigerwald et al. | ........... 321/2 |
| 4,014,777 | A | | 3/1977 | Brown | ........................ 204/270 |
| 4,057,479 | A | | 11/1977 | Campbell | ................... 204/258 |
| 4,074,344 | A | | 2/1978 | Pitel | ............................ 363/44 |
| 4,097,863 | A | * | 6/1978 | Chambers | |
| 4,176,018 | A | * | 11/1979 | Faron et al. | |
| 4,196,069 | A | * | 4/1980 | Mose et al. | |
| 4,210,512 | A | | 7/1980 | Lawrence et al. | ......... 204/257 |
| 4,252,628 | A | * | 2/1981 | Boulton et al. | |
| 4,323,444 | A | * | 4/1982 | Kawaura et al. | |
| 4,339,324 | A | | 7/1982 | Haas | ......................... 204/270 |
| 4,494,178 | A | * | 1/1985 | Ishima | |
| 4,533,455 | A | * | 8/1985 | Balko et al. | |
| 4,639,303 | A | | 1/1987 | Staab et al. | ................. 204/258 |
| 4,816,982 | A | | 3/1989 | Severinsky | ................... 363/44 |
| 5,049,246 | A | * | 9/1991 | Hull et al. | |
| 5,181,159 | A | * | 1/1993 | Peterson et al. | |

(List continued on next page.)

FOREIGN PATENT DOCUMENTS

| DE | 3232312 | * | 3/1984 | .................... 431/2 |
|---|---|---|---|---|
| FR | 1048401 | | 12/1953 | |
| GB | 2 270 749 | | 3/1994 | |
| JP | 52-125843 | * | 10/1977 | .................. 431/354 |
| JP | 6-241415 | * | 8/1994 | ............. 126/116 R |
| WO | WO-99/32832 | * | 7/1999 | |

*Primary Examiner*—Carl D. Price
(74) *Attorney, Agent, or Firm*—Christie, Parker & Hale, LLP

(57) ABSTRACT

The present invention provides a novel means for generating hydrogen gas which is particularly useful in domestic applications, particularly, a hydrogen-fueled gas fireplace. The hydrogen generating means comprises a filter-press electrolyzer that generates hydrogen from an electrolyte solution and has a relatively small size, e.g., about 600 mm$^2$, and is thus convenient for domestic use. Suitable domestic applications include cooking stoves and the like as well as gas fireplaces. A hydrogen-fueled fireplace comprises a housing containing a firebox, an electrolyzer, which comprises a series of electrolytic cells, and a power module.

25 Claims, 17 Drawing Sheets

U.S. PATENT DOCUMENTS

| | | |
|---|---|---|
| 5,196,104 A | 3/1993 | Munday ...................... 204/258 |
| 5,211,828 A * | 5/1993 | Shkarvand-Moghadddam |
| 5,244,588 A | 9/1993 | Chiang ....................... 204/241 |
| 5,279,260 A | 1/1994 | Munday ........................ 122/5 |
| 5,322,604 A * | 6/1994 | Cawfield |
| 5,331,534 A * | 7/1994 | Suzuki et al. |
| 5,342,497 A * | 8/1994 | Cathel |
| 5,401,371 A | 3/1995 | Oshima et al. ............. 204/258 |
| 5,479,915 A | 1/1996 | Riener ........................ 126/512 |
| 5,515,261 A * | 5/1996 | Bogdan |
| 5,517,399 A * | 5/1996 | Yamauchi et al. |
| 5,614,069 A * | 3/1997 | Lin |
| 5,793,623 A * | 8/1998 | Kawashima et al. |
| 5,997,283 A * | 12/1999 | Spiros |
| 6,002,103 A * | 12/1999 | Thommes |
| 6,146,780 A * | 11/2000 | Cisae et al. |

* cited by examiner

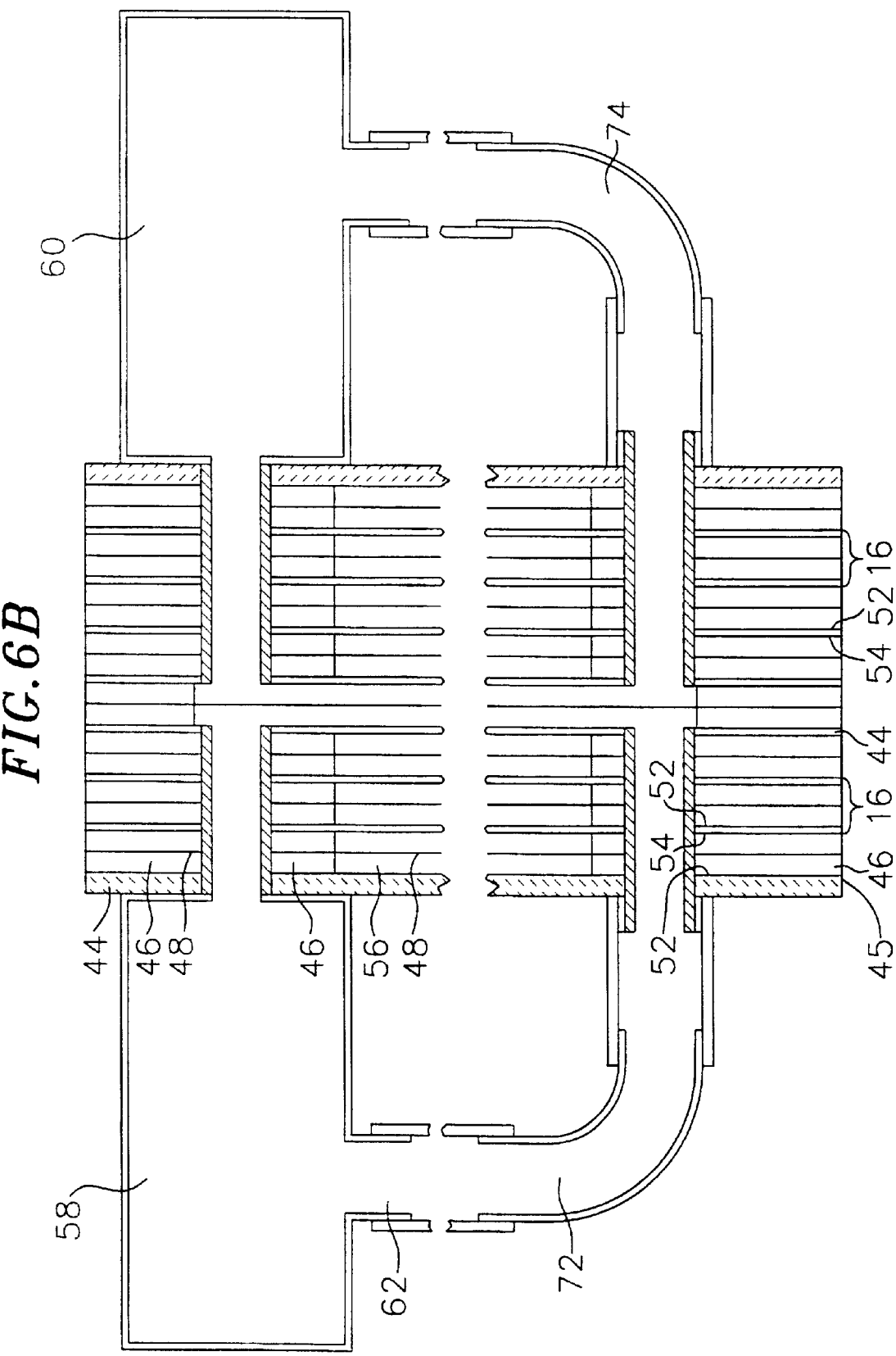

VOLTAGE WAVEFORMS

RECTIFIED INPUT

VARIABLE DUTY CYCLE CHOPPED POWER

FILTERED OUTPUT (SHOWN FOR RESISTIVE LOAD)

FIG. 12
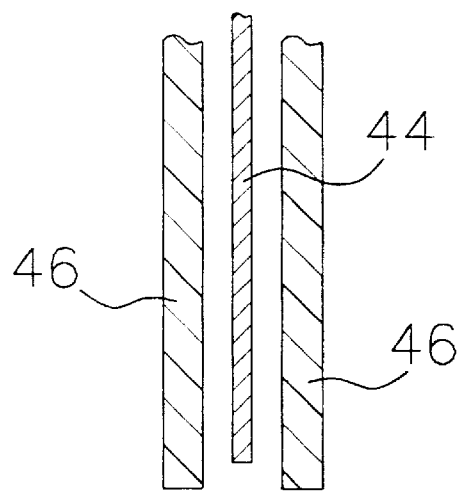
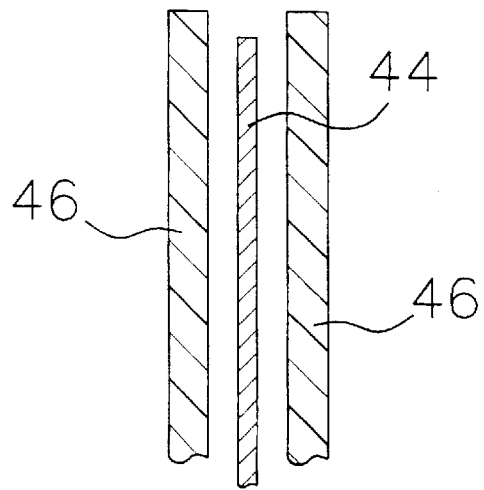
FIG. 13
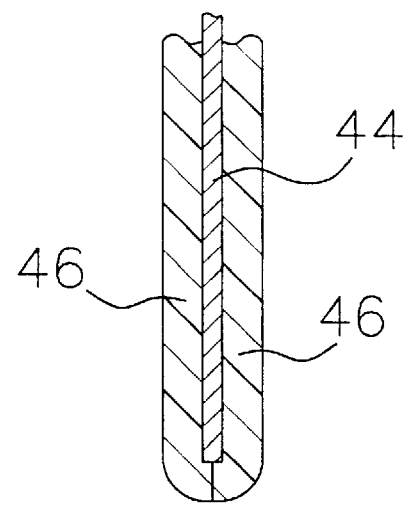
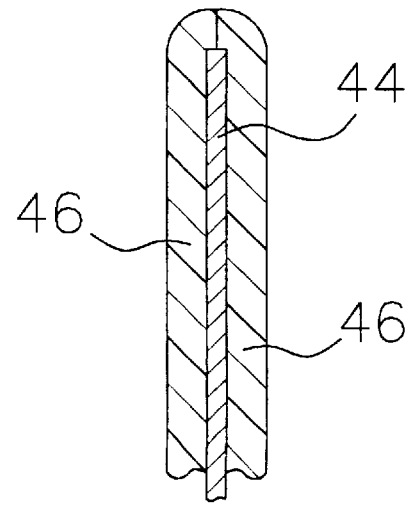

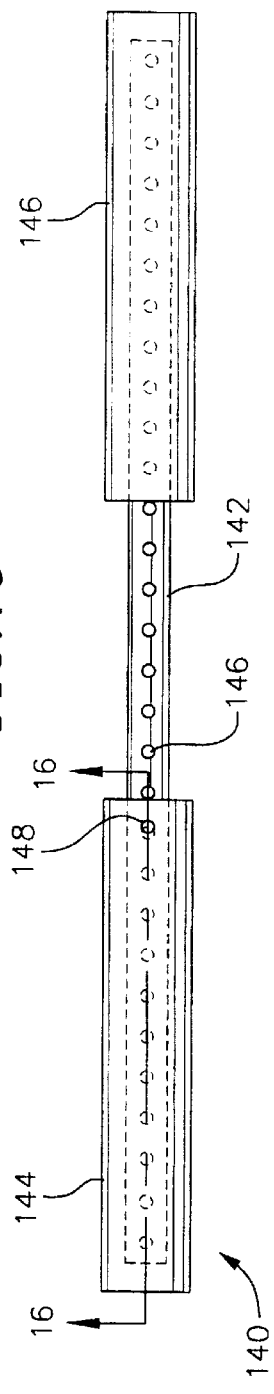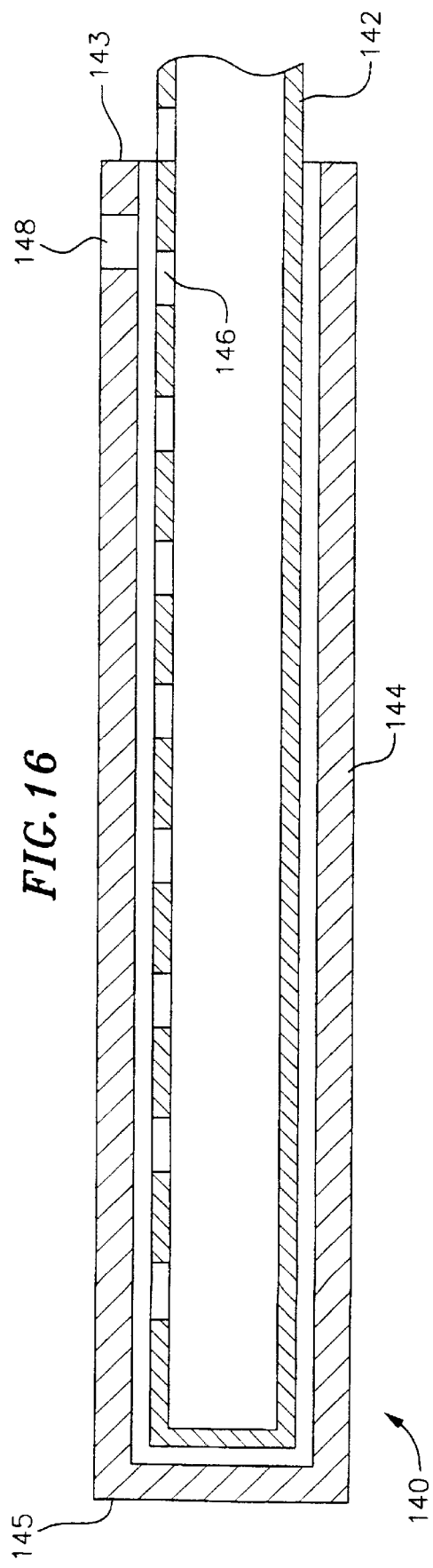

HYDROGEN-FUELED VISUAL FLAME GAS FIREPLACE

CROSS REFERENCE TO RELATED APPLICATION

This application claims priority of PCT/US98/27026, filed Dec. 19, 1998, which claims priority of U.S. Application Ser. No. 60/068,354, filed Dec. 19, 1997.

FIELD OF THE INVENTION

The present invention is directed to a hydrogen-fueled gas fireplace, and in particular a gas fireplace fueled by hydrogen generated by a small electrolyzer.

BACKGROUND OF THE INVENTION

Gas fireplaces are commonplace in many homes today. They are able to provide the advantages of real wood burning fireplaces without any of the disadvantages such as the hauling of wood logs and the clean up of soot. To produce flames, the fireplaces are equipped with one ora-plurality of burners. Each burner typically has a gas inlet and a plurality of outlet ports. Gas enters the burner through the gas inlet. The gas is ignited as it exits the outlet ports. Traditional gas fireplaces burn gases such as natural, which results in the production of undesirable emissions such a carbon monoxide, unburned hydrocarbons and nitrous oxide. Thus, a need exists for a gas fireplace that does not produce emissions, for example, by burning hydrogen.

The production of hydrogen using an electrolyzer is not new, but has previously been limited to industrial size applications, which involve large numbers of cells (typically 150) in series, in order to build up the overall voltage (at approximately 2 volts per cell) to the necessary voltage. There are two general types of electrolyzers. unipolar electrolyzers and filter press electrolyzers. Filter press electrolyzers have multiple cells in series such that the normal current flows from one end plate through each cell to the opposite end plate. Conventional electrolyzers have cells interconnected via an electrolyte distribution system comprising channels or ducts at the top of each cell for gas and electrolyte removal and at the bottom of each cell for electrolyte return. In other words, the electrolyte distributions systems are not individual to each cell. One of the problems associated with such traditional systems is that, in addition to the normal current flow, there are also parasitic flows through the channels or ducts that extend through adjacent cells for removal of gases and return of electrolyte supply. These parasitic flows have two negative effects. First they reduce the efficiency of the cells systems because the parasitic current flow creates heat rather than produces gas. Second, when the cells are not in use. reverse potentials may be created via the parasitic channels, giving rise to corrosion and deactivation. Thus, a need exists for a more cost-effective electrolyzer system, in particular. one that reduces parasitic current flows.

SUMMARY OF THE INVENTION

The present invention provides a novel means for generating hydrogen gas which is particularly useful in domestic applications, particularly, a hydrogen fueled gas fireplace. The hydrogen generating means comprises a filter-press electrolyzer that generates hydrogen from an electrolyte solution and has a relatively small size. e.g., about 600 $mm^2$, and is thus convenient for domestic use. Suitable domestic applications include cooking stoves and the like as well as gas fireplaces.

In one embodiment, the hydrogen generating means comprises a filter-press electrolyzer and a switch mode power supply. The electrolyzer has a series of between about 5 and 30 cells, more preferably between about 5 and 15 cells, that are capable of producing hydrogen gas and oxygen gas from an electrolyte solution. The switch mode power supply, which converts alternating current to unidirectional current, is electrically connected to the electrolyzer. This design avoids the need for a large, inconvenient transformer to power the electrolyzer.

In a preferred embodiment, the filter-press electrolyzer comprises a series of cells capable of producing hydrogen gas and oxygen gas from an electrolyte solution. wherein each cell comprises:

(i) a cathode plate capable of generating hydrogen gas from the electrolyte solution, (ii) an anode plate capable of generating oxygen gas from the electrolyte solution spaced apart from the cathode, (iii) a hydrogen and oxygen gas impermeable membrane spaced between the cathode and anode, (iv) a first gasket adjacent the periphery of the cathode between the cathode and the membrane, and (v) a second gasket adjacent the periphery of the anode between the anode and the membrane.

Preferably, the electrolyzer further comprises a hydrogen settling tank and an oxygen settling tank. The electrolvzer further comprises means for carrying hydrogen gas generated in each cell to the hydrogen settling tank and means for carrying oxygen generated in each cell to the oxygen settling tank. Preferred hydrogen and oxygen carrying means comprise a separate hydrogen and oxygen gas passages (or ducts) that extend through the cathode plates, anode plates, gaskets and membranes of the electrolyzer to hydrogen and oxygen pipes which extend to the hydrogen and oxygen settling tanks. By utilizing separate hydrogen and oxygen flowpaths for each cell, parasitic currents are significantly reduced, particularly where the settling tanks are constructed from non-conductive materials.

In another preferred embodiment, the invention is directed to a filter-press electrolyzer comprising a series of cells as described above. Each of the cathode, anode, membrane, first gasket and second gasket contains at least one hydrogen gas hole aligned to form at least one hydrogen gas flowpath that extends through the series of cells to the hydrogen settling tank. Each of the cathode, anode, membrane, first gasket and second gasket contains at least one oxygen gas hole aligned to form at least one oxygen gas flowpath that extends through the series of cells to the oxygen settling tank. Additionally each of the cathode, anode. membrane, first gasket and second gasket contains at least one electrolyte return hole to form at least one electrolyte return flowpath that extends from the hydrogen and oxygen settling tanks to and through the series of cells to return electrolyte carried to the settling tanks by the generated hydrogen and oxygen. Preferably, the hydrogen settling tank and oxygen settling tank are immediately adjacent to the cells. This design permits the electrolyte solution to circulate within the electrolyzer without the use of a pump, which may be required if the settling tanks are not in close proximity.

In yet another preferred embodiment, the flowpaths of the electrolyzer are insulated to reduce the creation of parasitic currents. Specifically, each hydrogen gas flowpath, each oxygen gas flowpath, and each electrolyte return flowpath is lined, at least in part, and preferably completely. by an insulating material.

A particularly preferred application of the above-describe electrolyzer is a hydrogen-fueled fireplace. The fireplace comprises a firebox. a burner assembly within the firebox, and a means for generating hydrogen gas and for directing generated hydrogen gas to the burner. Burning the hydrogen gas in the firebox in the presence of oxygen produces a flame. Preferred means for generating hydrogen gas include the above-described electrolyzer designs.

Fireplaces made in accordance with the present invention are capable of producing a flame effect from water and electricity. Moreover, the fireplace produces essentially zero emissions, avoiding carbon deposition, a serious concern when burning carbon-based fuels such as natural gas. Another advantage of the present fireplace is that the hydrogen flame produces a more natural flame, creating the appearance that the flame is "licking" out and around the logs.

In one preferred embodiment, the fireplace comprises a first plenum fluidly connected to the inside of the firebox and extending above, behind and below the firebox. A reservoir is located at the bottom of the first plenum. Water vapor generated by burning hydrogen in the presence of oxygen condenses as it falls within the plenum behind the firebox into the reservoir to thus recycle the water vapor.

In a more preferred embodiment, the fireplace further comprises a second room air plenum located behind the first plenum and above and below the firebox. The second plenum is open above and below the firebox to room air outside of the firebox. Room air passes into the bottom portion of the second plenum, passes up through the rear portion of the second plenum behind the firebox where it is heated by the heat combustion products in the first plenum, and out through the top of the second plenum at an increased temperature. By this design, a heat-exchanger effect is created. Preferably the heated room air exiting the fireplace is directed in a generally downward direction. Thus it appears that the heat generated from the fireplace is coming directly from the fire.

The invention also provides a flashback arrestor system. The flashback arrestor system comprises a primary chamber having a top and bottom and a gas outlet therefrom and an input chamber having a top and bottom and connected to a source of gas and liquid. A passage connects the bottom of the primary chamber to the bottom of the input chamber. A porous material extends across the primary chamber in such a manner that any gas passing through the primary chamber must pass through the porous material. Gas and liquid enter the input chamber and flow into the primary chamber. The gas is broken into small, non-contacting bubbles as it passes through the porous material. The non-contacting gas bubbles flow through the liquid in the primary chamber, thereby preventing gas flashback through the primary chamber. Preferably the flashback arrestor system further comprises a non-return valve in the input chamber.

In a particularly preferred embodiment, the fireplace and electrolyzer described above are combined with the above-described flashback arrestor system. Hydrogen gas and electrolyte solution enter the input chamber from the hydrogen settling tank and flow into the primary chamber. The hydrogen gas is broken into small, non-contacting bubbles as it passes through the porous material. The non-contacting gas bubbles flow through the electrolyte in the primary chamber, thereby preventing gas flashback through the primary chamber from the burner.

The present invention also provides a self-contained power module. The power module includes an enclosure having input and output connectors. Internal to the enclosure is a first full-wave rectifier which is connected to the input connector of the enclosure. The output of the first full-wave rectifier is coupled to a chopper. The chopper has an output with a variable duty cycle. The chopped output is applied to a primary winding of a transformer. The secondary winding of the transformer is connected to a second full-wave rectifier. The output of the second full wave rectifier is connected to the output connector of the enclosure. In this embodiment, when an AC voltage is applied to the input connector, a rectified sinusoidal waveform appears at the output connector.

DESCRIPTION OF THE DRAWINGS

These and other features and advantages of the present invention will be better understood by reference to the following detailed description when considered in conjunction with the accompanying drawings wherein:

FIG. 6B is a top cross-sectional schematic view of an alternative embodiment of the electrolyzer and settling tanks of the invention.

FIG. 12 is a side schematic view of two gaskets in contact with an intermediate cell plate.

FIG. 13 is a side schematic view of the two gaskets in contact with an intermediate cell plate of FIG. 12 when the cells are compressed together.

FIG. 15 is a side schematic view of an alternative burner assembly according to the invention.

FIG. 16 is a side cross-sectional view of the burner assembly of FIG. 15 along line 16—16.

DETAILED DESCRIPTION

Figure 1:
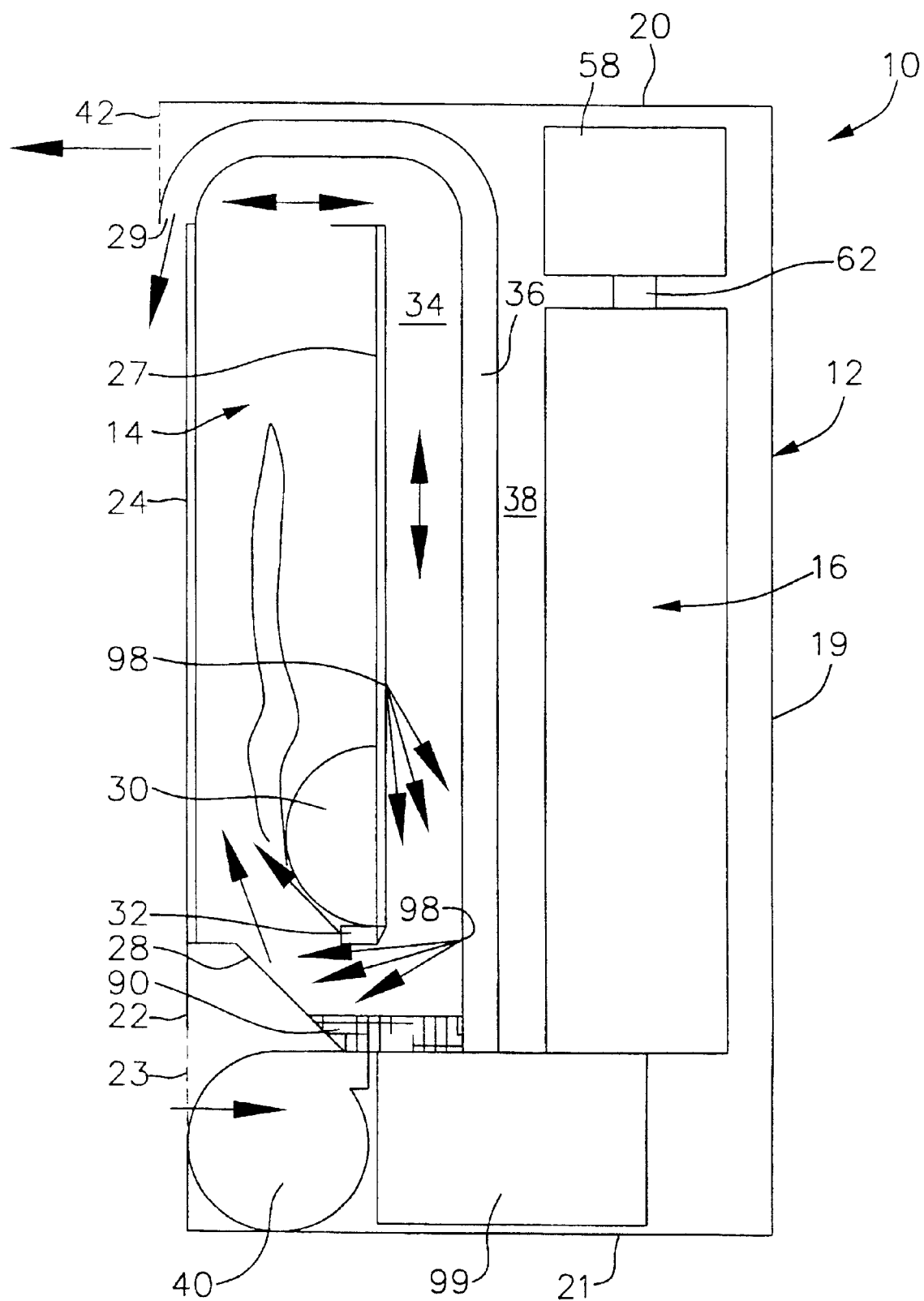
FIG. 1 is a side cross-sectional schematic view of a fireplace according to the invention.
Figure 2:
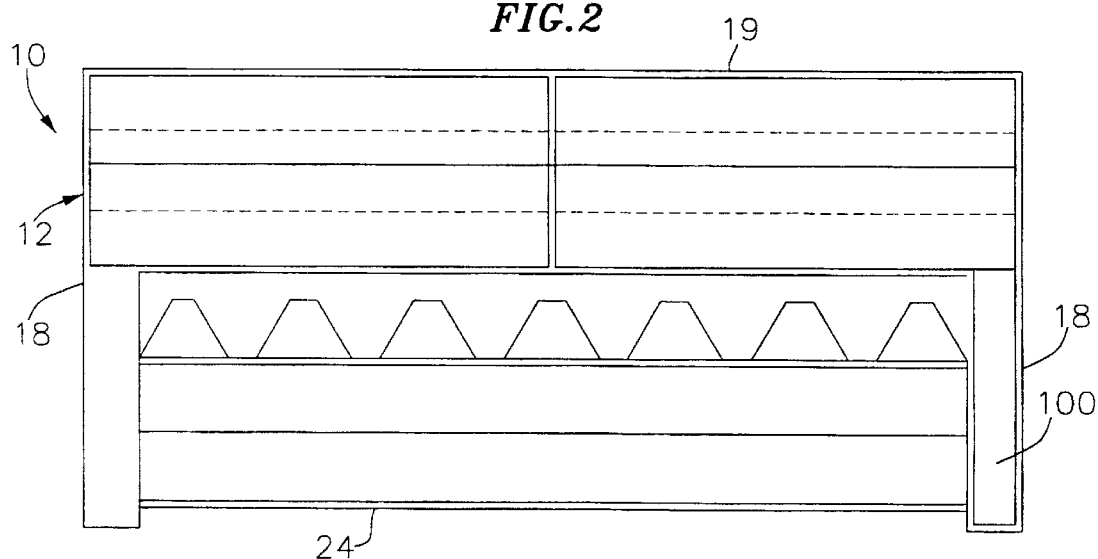
FIG. 2 is a top cross-sectional schematic view of a fireplace according to the invention.
Figure 3:
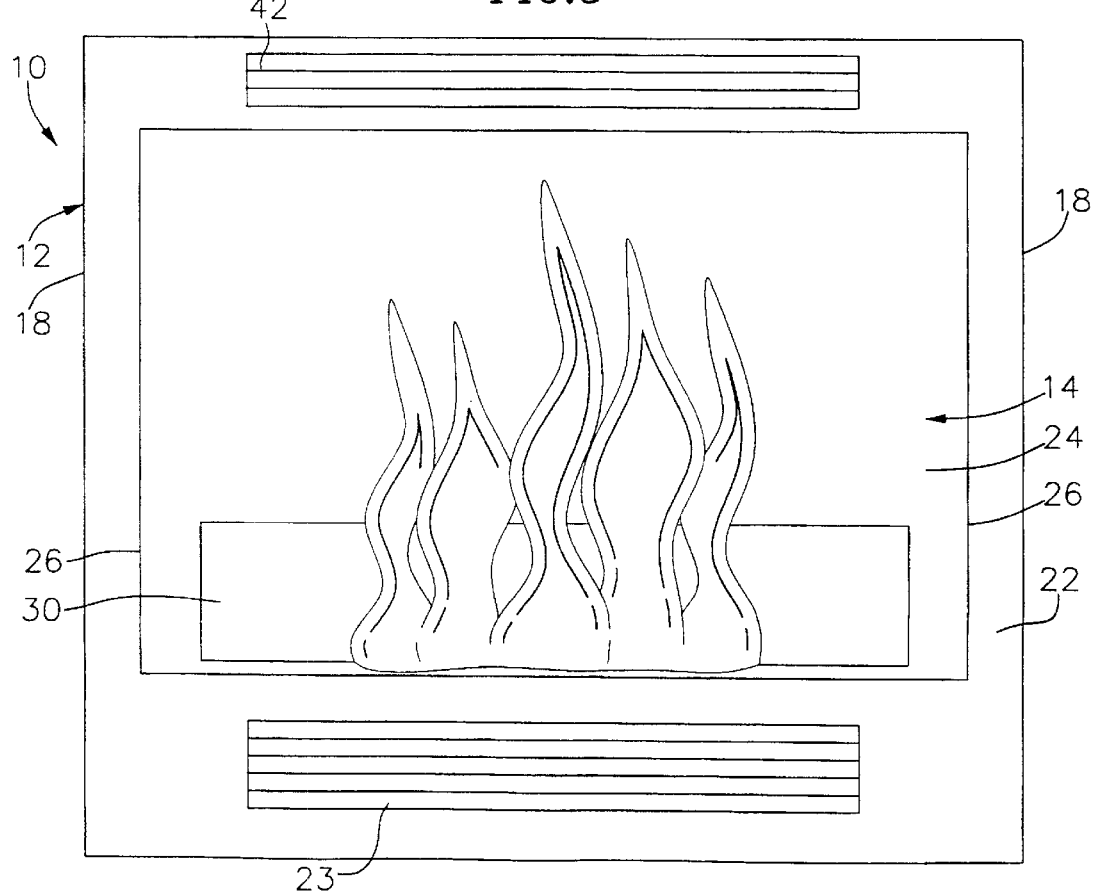
FIG. 3. is a front view of a fireplace according to the invention.

A preferred embodiment of a hydrogen-fueled fireplace according to the present invention is illustrated in the FIGS. 1 to 4. The fireplace 10 comprises a housing 12 containing a firebox 14, an electrolyzer 15, which comprises a series of electrolytic cells 16, and a power module 110.

The housing 12 comprises two side walls 18, a back wall 19, a top wall 20, and a bottom wall 21. The front of the housing 12 comprises a front wall 22 with the center of the front wall 22 forming a window to allow users to see into the fireplace 10. The window of the front wall 22 is preferably spanned with a glass pane 24. Alternatively, the window can be completely open. The bottom of the front wall 22 contains a grill 23 to permit room air to enter a room air plenum between the bottom 21 of the housing 12 and the bottom of the firebox 14. as described further below. The walls 18, 19, 20, 21, and 22 can be made of any suitable fire-resistant material, and even with glass if desired. For example, the walls can be made of cast refractory made to look like brick, black-painted corrosion protected steel, or reflective material such as stainless steel or enameled steel. Preferably the walls are made of chemically-brightened clear anodized polished aluminum to create the illusion of a larger fireplace.

The firebox 14 is situated in the front of the housing 12, generally behind the window of the front wall 22. The firebox 14 comprises two side walls 26, a back wall 27, and a bottom wall 28. If desired, the firebox 14 can share one or more walls with the housing 12. The top of the firebox 14 comprises an opening. The center of the front wall 22 of the housing 12, which in the depicted embodiment is the glass cover 24, forms a portion of the front wall of the firebox 14. A burner 32 is provided at the bottom of the firebox 14, with one or more logs 30 provided above the burner 32. The logs 30 are provided for aesthetic purposes and can be made of any suitable fire-resistant material, such as, for example, cast-colored concrete or ceramic. The burner 32 is preferably situated below the logs 30 to produce a visual flame arranged to come licking out from directly below, and preferably between, the logs 30. Alternatively. the one or more of the logs 30 can contain a hole into which or under which the burner 32 extends. If desired, imitation coals can be used in place of or in combination with the logs. Additionally, materials such as salts and oxides can be added to the logs or coals to enhance the flame color.

The electrolyzer 15 is positioned in the housing 12 behind the firebox 14. Sufficient space is provided between the firebox 14 and the cells 16 to permit three plenums for gas flow to create a heat exchanger effect, described in more detail below. A first plenum 34 is fluidly connected to the inside of the firebox 14, extending above, behind and below the firebox. As used herein, the term "fluidly connected" is intended to mean connected in a manner that permits passage of liquids and/or gases. A second plenum 36 is located behind the first plenum 34. The second plenum 36 is fluidly connected to the room air outside of the fireplace 10 and extends above, behind and below the firebox 14 and first plenum. A third plenum 38 is located behind the second plenum 36 and is adjacent to the cells 16. The third plenum 38 is fluidly connected to the upper and lower portions of the second plenum 36 and allows room air to pass around and into the electrolyzer 15.

The electrolyzer 15 produces hydrogen gas and oxygen gas, which are supplied to the firebox 14. Preferably the electrolyzer contains from 5 to 30 cells, more preferably from 5 to 15 cells. In the illustrated embodiment of FIGS. 5 and 6, the electrolyzer 15 comprises a series of eight cells 16. Because of its relatively small size, the electrolyzer can be powered by a switch mode power supply, for example, the power supply sold under the name RMMA 1500 by Lincoln.

Figure 5A:
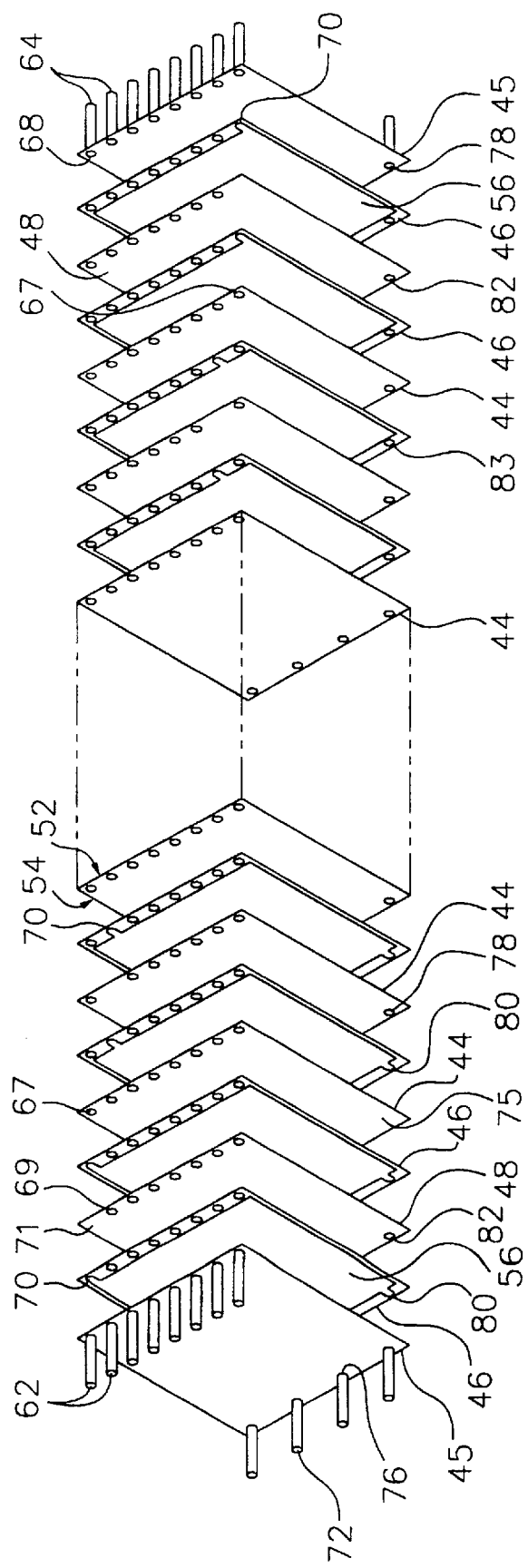
FIG. 5A is an illustration demonstrating the structure of the cells in the electrolyzer of the invention.
Figure 6A:
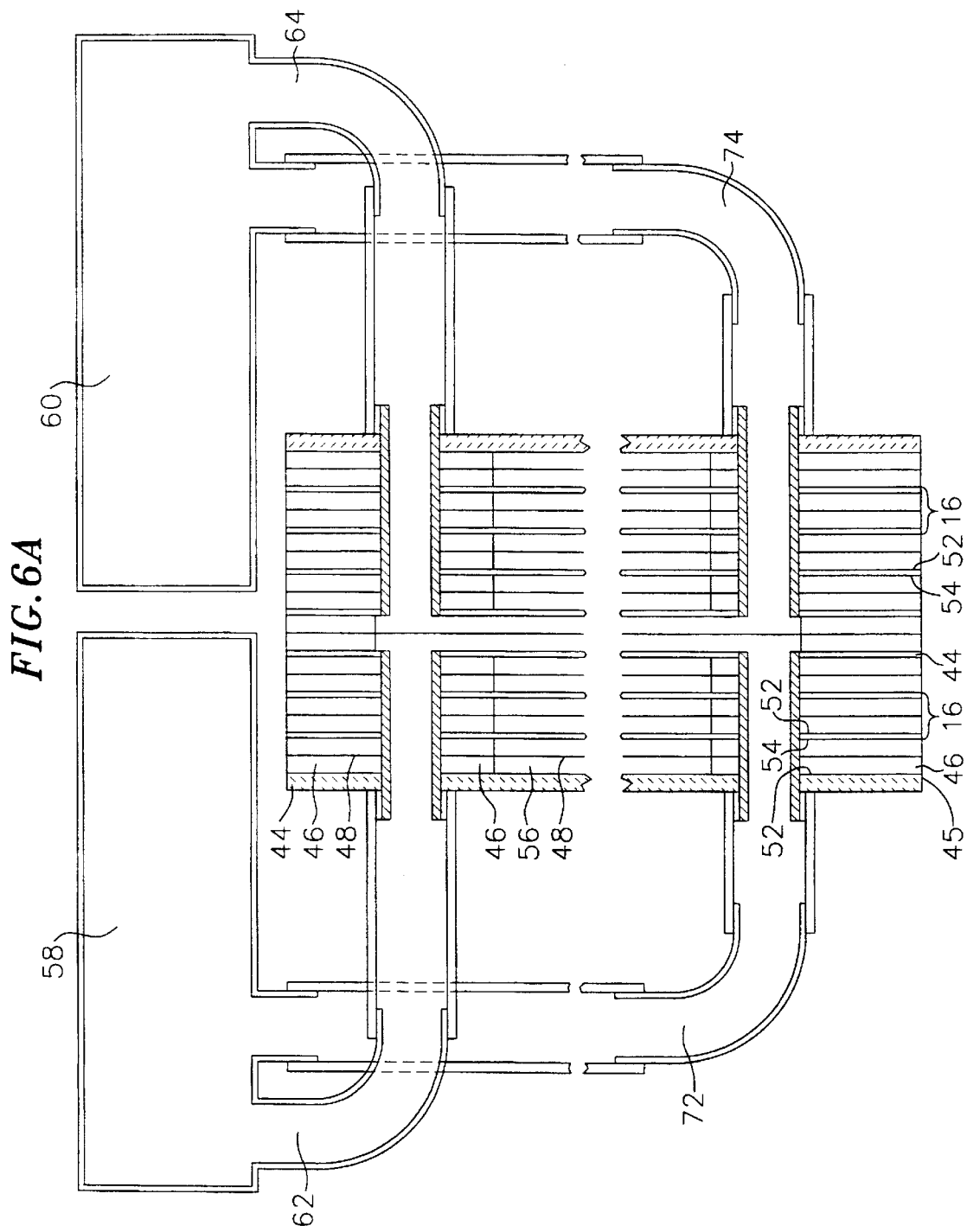
FIG. 6A is a top cross-sectional schematic view of the electrolyzer and settling tanks of the invention.
Figure 7:
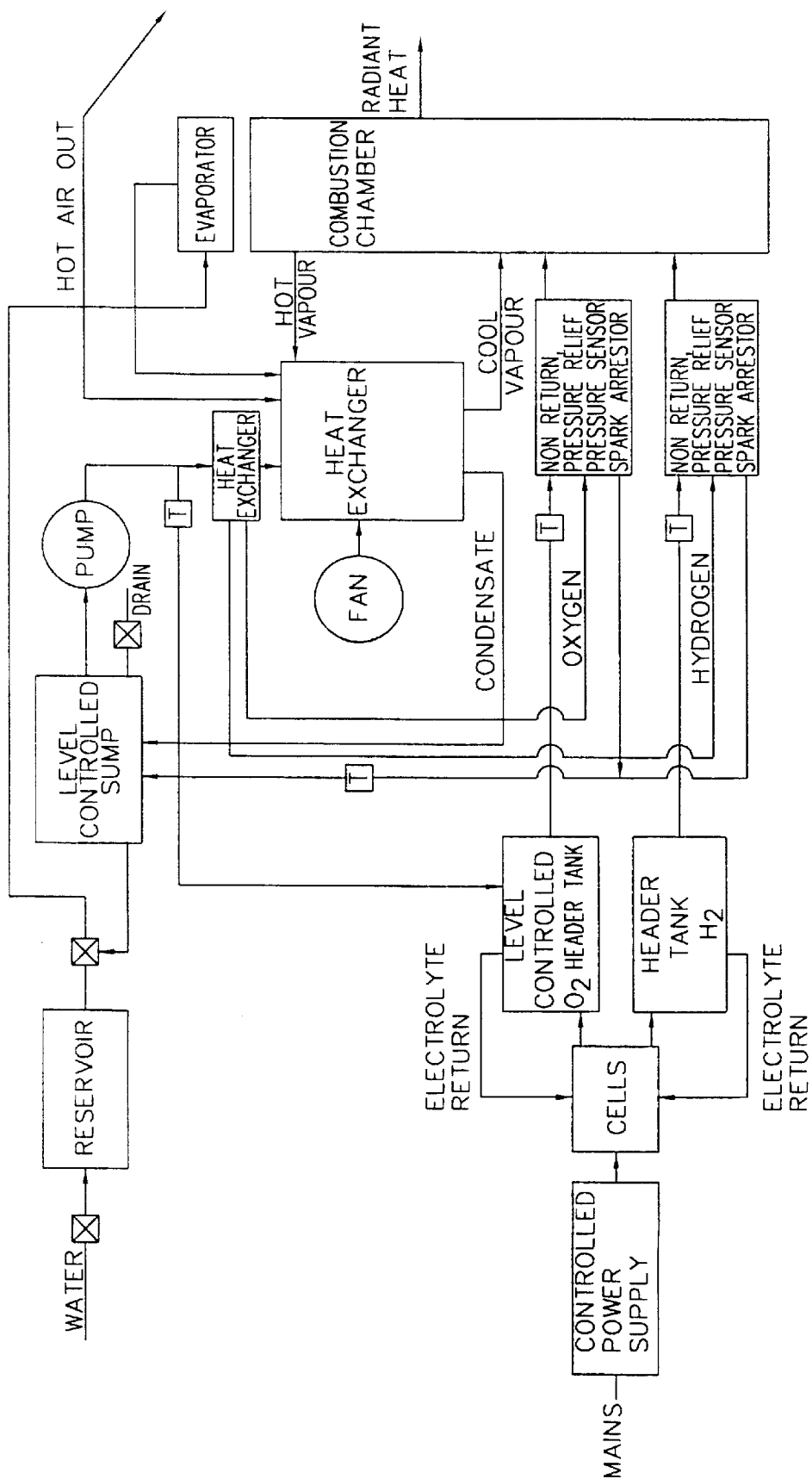
FIG. 7 is a flow chart describing the relationships between the components of the fireplace and the components of the fuel cells.

With reference to FIGS. 5A and 6A, each cell 16 comprises two interior plates 44 or an interior plate 44 and an end plate 45, two insulating gaskets 46, an ion-permeable membrane 48, and electrolyte solution 50. Within each cell 16, the membrane 48 is sandwiched between the two gaskets 46, and this combination is sandwiched between the two plates 44 or 45.

The electrolyte solution 50 is preferably a 20 to 40% wt/vol potassium hydroxide solution, more preferably 30% wvt/vol potassium hydroxide solution. Preferably the electrolyte solution 50 further comprises sodium hydroxide in a concentration of about 1% or less to enhance the color of the flames from the burner. Calcium ions can also be added to enhance flame color.

Each interior plate 44 constitutes a part of two different cells 16, and each of the two end plates 45 at the two ends of the electrolyzer constitutes a part of only one cell. Thus, for the illustrated embodiment, where the series contains eight cells 16, seven interior plates 44 and two end plates 45 are used.

Each interior plate 44 constitutes a cathode 52 for one cell 16 and an anode 54 for an adjacent cell 16. With respect to the two end plates 45, one constitutes only a cathode 52 and one constitutes only an anode 54. In each cell 16, hydrogen is produced at the cathode 52, the hydrogen-generating side of the cell, and oxygen is produced at the anode 54, the oxygen-generating side of the cell.

The plates 44 and 45 can be any suitable shape. The size of the plates 44 and 45 is dependent on the size of the fireplace 10. For example, a 600 mm square electrolyzer suits most fireplace dimensions, so that the size of the plates 44 and 45 is about 550 mm square. A factor that limits the size of the plates 44 and 45 is the current density in the cells 16. As the current through the cells rises, the voltage across each cell rises and the energy dissipated in the cells rises, thus heating the system. It is undesirable to generate too much heat in the system because the temperature of the system should be below the boiling point of the electrolyte solution, which is about 115° C. A preferred temperature of the electrolyzer is about 100° C. To maintain this temperature, the current density must be held below about 1 amp/cm$^2$, and preferably at about 0.25 amp/cm$^2$. If a practical maximum limit of 10 kW is used for a fireplace in a domestic situation (to avoid overloading the domestic power supply), for example, then the plates 44 and 45 cannot be less than about 238 mm square (assuming a series of 8 cells). If the number of cells is increased, then the size of the cells can be decreased proportionally.

The plates 44 and 45 can be made of any suitable material, preferably coated high nickel content stainless steel. The surface of each plate 44 and 45 that acts as a cathode 52 is coated with a material that enhances its ability to produce hydrogen. Examples of such materials include a plasma-coated surface mixture of 90% Sulzer 56F(Ni) [commercially available from Sulzer] and 10% Sulzer 41F (SS) [commercially available from Sulzer] powder or raney nickel. Similarly, the surface of each plate 44 that acts as an anode 54 is coated with a material that enhances its ability to produce oxygen. Examples of such materials include a combination of nickel molybdenum and iron as well as cobalt spinels.

The gaskets 46 can be made of any suitable insulating material, preferably neoprene or ethylenepropylenediene monomer (EPDM). Each gasket 46 has a length and height similar to, and preferably the same as, the plates 44. Each gasket 46 forms a generally rectangular chamber 56 that accommodates the electrolyte solution 50. In each cell, electrolyte solution 50 is located within the chambers 56 formed by gaskets 46, between the corresponding plate 44 and the membrane 48.

The membranes 48 keep the hydrogen gas generated at the cathode surface separate from the oxygen gas generated at the anode surface within each cell 16. Each membrane 48 is made of any suitable ion-permeable material, which is relatively hydrogen and oxygen impermeable, that will not permit the passage of the hydrogen and oxygen gas. Examples of suitable materials include asbestos, polypropylene, polyethylene, PFTE, PVDF, flemion, Nafion and nickel oxide. A particularly preferred membrane is made of polypropylene. Each membrane 48 has a length and height similar to, and preferably the same as, the plates 44 and gaskets 46. Within each cell 16, the membrane 48 is preferably positioned about twice as far from the cathode 52 (the hydrogen-generating side of the cell) as from the anode 54 (the oxygen-generating side of the cell) because the ratio of hydrogen produced to oxygen produced is 2:1. This means that the gasket 46 between the cathode surface of plate 44 and the membrane 48 is about twice the thickness as the gasket 46 between the anode surface of plate 44 and membrane 48.

Preferably the membranes 48 are treated to be hydrophilic to increase their wettability, for example, by corona discharge or by other technique known to those skilled in the art. An example of a suitable treated material is spun-bonded hydrophilic polypropylene, such as that available from Mogul (Turkey). Additionally, or alternatively, surfactant can be added to the electrolyte solution 50 to enhance the wettability of the membranes. The amount of surfactant in the electrolyte solution should be less than about 0.1% to reduce foaming. An example of a suitable surfactant is Orica Alkdet 15 (an alkyl polysaccharide commercially available from Orica Surfactants, Melbourne, Australia).

With reference to FIG. 6A, the electrolyzer includes two settling tanks, a hydrogen settling tank 58 and an oxygen settling tank 60. Each settling tank 58 and 60 preferably comprises a non-conductive material such as polypropylene. The settling tanks preferably have a width of at least about 50 mm, a length of about 600 mm, and a height of at least about 75 mm, more preferably about 150 to 200 mm.

Fluidly connected to the hydrogen settling tank 58 are eight hydrogen gas pipes 62, each one corresponding to one of the eight cells 16. Each hydrogen gas pipe 62 is fluidly connected to the top of a different cell 16 at its hydrogen-generating chamber, as described in more detail below. Similarly, eight oxygen gas pipes 64 are fluidly connected to the oxygen settling tank 60. Each oxygen gas pipe 64 is fluidly connected to the top of a different cell 16 at its oxygen-generating chamber. The hydrogen gas pipes 62 and oxygen gas pipes 64 can be made of any suitable material that is non-conducting, is resistant to concentrated caustic solution at about 90° C. and has adequate tolerance for expansion and contraction. Suitable materials include polyethylene, polypropylene, PFTE, and PVDF. a presently preferred material is polypropylene. The size of hydrogen gas pipes 62 and oxygen gas pipes 64 is not critical. Preferred gas pipes 62 and 64, for example, may have an inner diameter of from about 6 mm to about 50 mm.

To accomplish the fluid connections between the hydrogen and oxygen gas pipes and the hydrogen and oxygen generating chambers of the electrolyzer cells, the plates 44 and 45, gaskets 46 and membranes 48 have a series of interconnected holes. Specifically, each end plate 45 has 8 holes along its top edge, as shown in FIG. 5A. The end plate 45 that is a cathode 52 has eight hydrogen holes 66, each corresponding to one of the eight hydrogen gas pipes 64. The end plate 45 that is the anode 54 has eight oxygen holes 68, each corresponding to one of the eight oxygen gas pipes 64. The hydrogen holes 66 and oxygen holes 68 are generally aligned with each other and preferably have a diameter similar to the corresponding gas pipes 62 and 64 (shown in FIG. 5A cut away a short distance from the end plates 45). The gas pipes 62 and 64 can be fixedly attached to the end plates 45 by any suitable means, for example, using fixtures made of stainless steel, polypropylene, or any other corrosion-resistant material.

All of the interior plates 44 have 8 holes adjacent their top edge in alignment with the hydrogen holes 66 and oxygen holes 68 of end plates 45. The membranes 48 have seven holes 69 adjacent their top edge in alignment with seven of the hydrogen and oxygen holes 66 and 68 of end plates 45 and holes 67 of interior plates 44. The membranes 48 also each have a blocking area 71 that occupies the space which would otherwise be occupied by an eighth aligned hole. Each membrane 48 has a blocking area 71 aligned with a different hydrogen hole 66 or oxygen hole 68.

The gaskets 46 also have seven holes in alignment with the hydrogen holes 66 and oxygen holes 68. In addition, each gasket 46 has a notch 70 in alignment with the eighth hydrogen hole 66 and oxygen hole 68. The notch 70 of a particular gasket 46 is also aligned with the blocking area 71 of the membrane 48 adjacent that gasket 46.

Figure 5B:
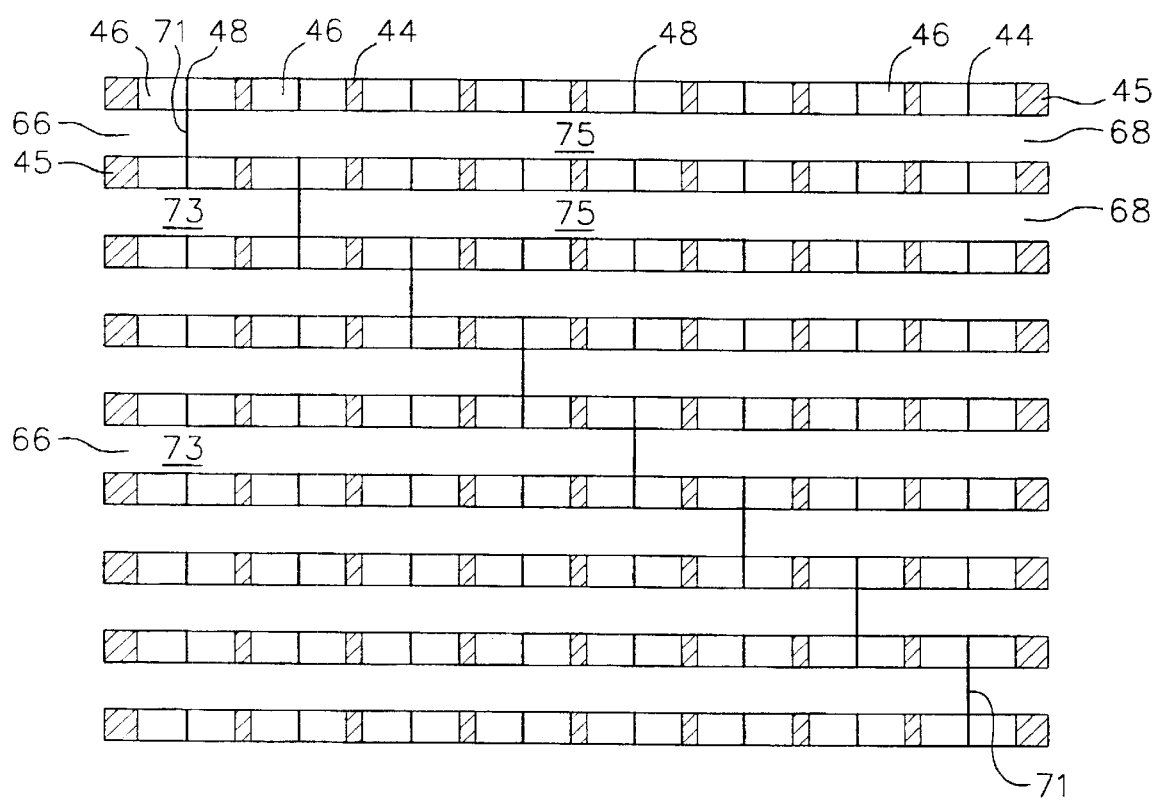
FIG. 5B is a cross-sectional schematic view of the hydrogen and oxygen ducts of the electrolyzer.

As shown in FIG. 5B, the holes 66 or 68 in the end plates 45, interior plates 44. gaskets 46 and membranes 48, in combination with the notches 70 and blocking areas 71, form eight hydrogen ducts 73 for passage of hydrogen gas from the hydrogen-generating chamber of each cell 16 to the hydrogen gas pipes 62. One hydrogen duct 73 is associated with the hydrogen-generating chamber of each cell 16. Likewise, there are formed eight oxygen ducts 75 for the passage of oxygen from the oxygen-generating chamber of each cell 16 to the oxygen pipes 64. There is one oxygen duct 75 for each cell. The hydrogen ducts 73 and oxygen ducts 75 are arranged as shown in FIG. 5B. The notches 70 allow hydrogen gas and oxygen gas generated in their respective cell chambers to pass into the associated hydrogen duct 73 or oxygen duct 75 for passage to corresponding the hydrogen pipe 62 or oxygen pipe 64.

The hydrogen and oxygen gas travels through the ducts 73 and 75 and pipes 62 and 64 to the settling tanks 58 and 60. Along with the hydrogen and oxygen gas, a small amount of electrolyte solution 50 also passes to the settling tanks. Thus, a mechanism is provided for recycling this electrolyte solution 50 back to the cells 16. A preferred mechanism is four hydrogen-electrolyte return pipes 72 fluidly connected to the hydrogen settling tank 58 and four oxygen-electrolyte return pipes 74 fluidly connected to the oxygen settling tank 60. Each hydrogen-electrolyte return pipe 72 corresponds to one of the four cells 16 on the side of the hydrogen settling tank 58. Each hydrogen-electrolyte return pipe 72 is fluidly connected to the bottom of a different cell 16 at its hydrogen-generating chamber, as described in more detail below. Similarly, each oxygen-electrolyte return pipe 74 corresponds to one of the four cells 16 on the side of the oxygen settling tank 60. Each oxygen-electrolyte return pipe 74 is fluidly connected to the bottom of a different cell 16 at its oxygen-generating chamber. The electrolyte return pipes 72 and 74 permit the recycling of electrolyte solution 50 to the series of cells 16. The electrolyte return pipes 72 and 74 can be made of any suitable material, such as polyethylene, polypropylene, PFTE and PVDF. The size of the electrolyte return pipes 72 and 74 is not critical. Presently preferred electrolyte return pipes 72 and 74 can have an inner diameter of from about 6 mm to about 50 mm.

Figure 5C:
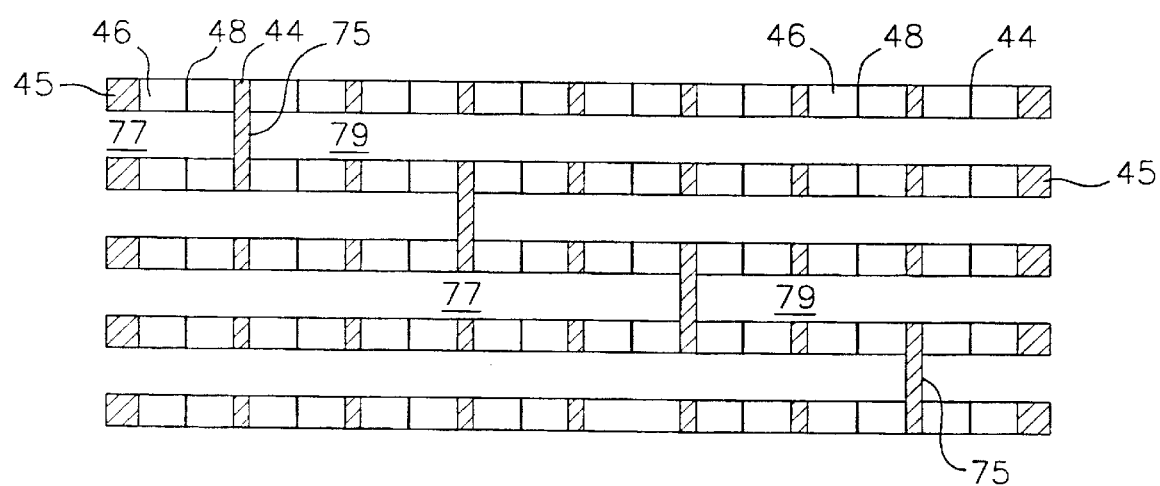
FIG. 5C is a cross-sectional schematic view of the electrolyte ducts of the electrolyzer.

To accomplish fluid connections between the cells 16 and the electrolyte return pipes 72 and 74, each end plate 45 has four holes along its bottom edge. As shown in FIGS. 5A and 5C, the end plate 45 that is a cathode 52 has four hydrogen-electrolyte return holes 76, each corresponding to one of the four hydrogen-electrolyte return pipes 72. The end plate 45 that is the anode 54 has four oxygen-electrolyte return holes 78, each corresponding to one of the four oxygen-electrolyte return pipes 74. The electrolyte return holes 76 and 78 are generally aligned with each other and preferably have a diameter similar to the corresponding electrolyte return pipes 72 and 74. The electrolyte return pipes 72 and 74 can be fixedly attached to the end plates 45 by any suitable means, as described above.

All of the membranes 48 have four holes 82 adjacent their bottom edge in alignment with the electrolyte return holes 76 and 78 of the end plates 45. Every other interior plate 44 (four total), starting with the interior plates nearest the end plates 45, has three holes 76 and 78 adjacent its bottom edge in alignment with three of the electrolyte return holes 76 and 78. These four interior plates 44 each also have a blocking area 75 that occupies the space that would otherwise be occupied by a fourth aligned hole. Each of these four interior plates 44 has a blocking area 79 aligned with a different electrolyte return hole 76 and 78. The remaining three interior plates 44 have four holes 76 and 78 adjacent their bottom edge in alignment with the four electrolyte return holes 76 and 78.

Each gasket 46 has three holes 83 in alignment with the electrolyte return holes 76 and 78. In addition, each gasket 46 has a notch 80 in alignment with the fourth electrolyte return hole 76 or 78. For each cell, the notches 80 of the two gaskets 46 of that cell are aligned with each other and are also aligned with the blocking area 75 of the interior plate 44 adjacent that cell.

As shown best in FIG. 5C, the holes 76 and 78 in the end plates 45 and interior plates 44, the holes 83 in the gaskets 46, and the holes 82 in the membranes 48, in combination with the notches 80 in the gaskets and the blocking areas 75 in the alternating interior plates, form four hydrogen electrolyte ducts 77 for passage of electrolyte 50 from the hydrogen settlin, tank 58 to the cells and four oxygen electrolyte ducts 79 for passage of electrolyte from the oxygen settling tank 60 to the cells. Each duct 77 and 79 is associated with a different cell. The notches 80 in the gaskets 46 permit returned electrolyte to pass into the hydrogen-generating chamber and oxygen generating chamber of each cell.

In the above arrangement, a thermosiphon (thermally-generated siphon) effect is created that circulates the electrolyte solution 50 through the cells 16 and settling tanks 58 and 60. The electrolyte 50 cools as it returns to the cells 16 from the settling tanks, allowing the cells to be maintained at optimum temperatures. The level of electrolyte solution 50 in the settling tanks 58 and 60 may be maintained at a relatively constant level by allowing any excess to discharge from the oxygen settling tank 60 or from the hydroglen settling tank 58 into a reservoir tray 90 in the housing 12 by means of an additional pipe (not shown). A switch (not shown) is provided to warn and/or turn off the fireplace 10 if the level of the electrolyte solution 50 in the hydrogen settling tank 58 or oxygen settling tank 60 falls too low. Additionally, a U-tube (not shown) may connect the settling tanks 58 and 60 to equalize the pressure in the tanks. If desired. the U-tube can be formed by one or both of the electrolyte return pipes 72 and 74.

In a particularly preferred embodiment, as shown in FIG. 6B, the hydrogen settling tank 58 and oxygen settling tank 60 are immediately adjacent to the electrolytic cells 16. The settling tanks 58 and 60 are positioned generally in line with the tops of the electrolytic cells 16. The hydrogen and oxygen settling tanks 58 and 60 are bonded directly to the two end plates 45 and are in fluid communication with the eight hydrogen holes 66 and eight oxygen holes 68, respectively, at the top of the end plates 45. When the settling tanks 58 and 60 are bonded directly to the end plates 45, a thin gasket (not shown) is preferably included between settling tanks 58 and 60 and the two end plates 45 to act both as an insulator and a sealant for the holes in the end plates.

With this design, it is unnecessary to provide hydrogen gas pipes 62 and oxygen gas pipes 64 as shown above. By positioning the hydrogen and oxygen settling tanks 58 and 60 in this manner, it is also unnecessary to use a pump for circulation of the electrolyte solution 50, which may be required if the settling tanks are not in close proximity. If desired the hydrogen and oxygen settling tanks 58 and 60 can be immediately adjacent to the electrolytic cells 16 and not directly connected to the end plates 45. Rather, they are connected by a relatively short pipe. As used herein, the phrase "immediately adjacent to" means that the settling tanks 58 and 60 are positioned within a select distance of the end plates 45, the select distance being equal to the length of ten diameters of the hydrogen and oxygen holes 66 and 68 in the end plates 45, which corresponds to the diameter of the hydrogen and oxygen ducts along the length of the cells. Preferably the select distance is equal to the length of five diameters of the hydrogen and oxygen holes 66 and 68, more preferably zero diameters of the hydrogen and oxygen holes 66 and 68.

Within the oxygen and hydrogen ducts and electrolyte ducts, a lining of insulation is preferably provided. In the oxygen and hydrogen ducts and electrolyte ducts, the electrolyte solution 50 is exposed to metal as it passes through the holes in each plate 44 and 45. This exposure allows conduction from the edge of the holes in the plates 44 and 45 to the electrolyte solution 50, which is a parasitic current flow. A lining of insulating material can cut off these flows. The insulating material is a material that is non-conducting and resistant to concentrated caustic solution at 90° C. such as, for example. polyethylene, polypropylene, PFTE, PVDF and certain ceramics.

Alternatively, the insulating material can be the gasket material. As shown in FIGS. 12 and 13, the hole in each plate 44 is made slightly larger than the hole in each gasket 46. When the gasket 46 is compressed slightly, it expands into the gap formed by the hole in the plate 44, sealing off and insulating the edges of the hole.

Regardless of what insulating method is employed, the total surface area of the oxygen and hydrogen ducts and electrolyte ducts covered by insulating material is preferably at least 50%, and more preferably 100%.

In a particularly preferred embodiment, the top of each membrane 48 is laminated with a gas-impermeable material. For example, each membrane 48 can be laminated with impermeable polypropylene or the like. The lamination preferably covers approximately the top inch of the membrane 48. The lamination decreases the likelihood of contact between the hydrogen and oxygen gases on opposing sides of the membrane 48, which might otherwise occur in the top portion of each chamber (e.g., the top 0.75 inch or so) on each side of the membrane 48 where gas collects but no liquid is present.

Also in a particularly preferred embodiment, the interior plates 44 and end plates 45 contain multiple separators 51 and 53. The separators ensure that each membrane 48 can be very thin and that it can be kept in the center of its respective cell 16. A thinner membrane lowers the cell resistance and heating losses for a given membrane material.

Figure 11:
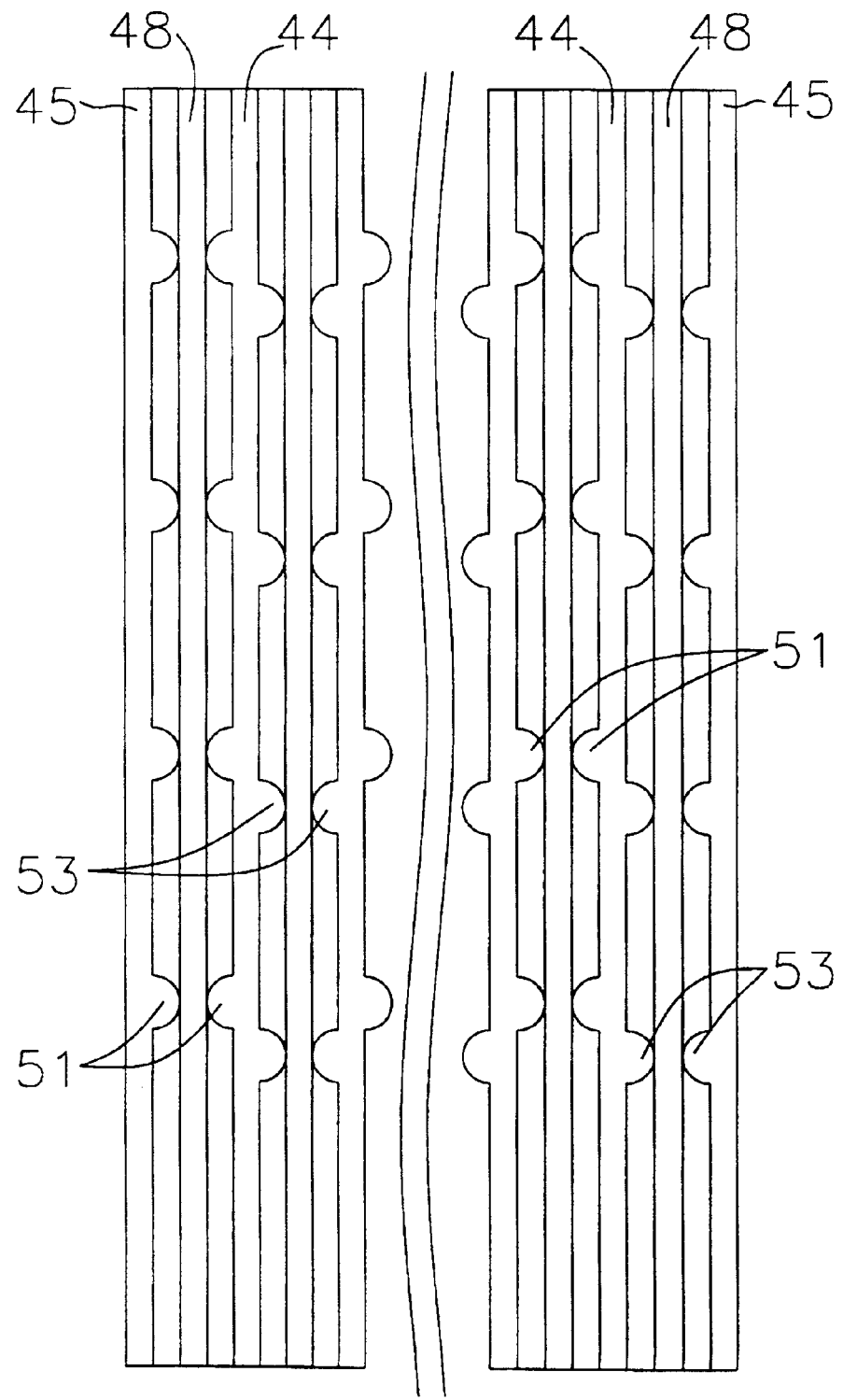
FIG. 11 is a side cross-sectional schematic view illustrating how separators are arranged on the interior and end plates.

In the embodiment shown in FIG. 11, the separators 51 and 53 are formed directly into the metal plates 44 and 45. The separators 51 and 53 are arranged so that there is a small clearance (e.g., about 0.005 inch) between the separator and the membrane 48 to allow for expansion, contraction and other movement of the membrane without inducing any stresses or wear in the membrane.

FIG. 11 shows how the separators 51 and 53 are arranged on the plates 44 and 45. In FIG. 11, the gaskets are not depicted for clarity. The left end plate 45 contains four upper separators 51. The interior plate 44 adjacent the left end plate 45 contains four upper separators 51 on its left surface and four lower separators 53 on its right surface. The upper separators 51 on that interior plate 44 are aligned with the upper separators 51 on the left end plate 45. The next interior plate 44 is the mirror image of the previous interior plate. Thus, each interior plate 44 has upper separators 51 on one surface aligned with upper separators of a neighboring plate and lower separators 53 on its other surface aligned with lower separators of the other neighboring plate. The right end plate 45 only has lower separators 53.

In an alternative design, the metal separators are replaced by plastic separation members. To this end, holes are punched in the plates 44 and 45, and plastic separation members are inserted through the holes. This alternative design eliminates potential conduction that can occur between the metal separators through the membrane. in another alternative design, a plastic network or grid could be placed between each plate and membrane.

In another preferred design, the plates 44 and 45 are modified to increase the surface area of each cathode 52 and anode 54. Increasing the surface area of each cathode 52 and anode 54 decreases the overall voltage of the cell and improves efficiency. Accordingly, the surface area of each cathode 52 and anode 54 is increased, for example, by adding swaged or cut grooves on the surface. Alternatively, the surface can be modified by adding ribs, bumps or the like. The size of the swaged or cut grooves (or ribs or bumps) is sufficiently deep so as not to be filled in and leveled during the plating process. Preferably the swaged grooves are formed to have approximately a 60° angle. The swaged grooves or other surface modification can be formed by any method known to those skilled in the art, e.g., by a conventional shaping machine or with a laser.

Additionally, fins can be provided on the outside of the end plates 45 to provide additional cooling in additional to that provided by the circulation of air through the third plenum 38. Any suitable fins could be used, for example 1.5 inch fins made of the same material as the end plates 45, which in a preferred embodiment is stainless steel.

A power module 110 is electrically connected to each of the end plates 45 so that unidirectional current flows from the cathode end plate, through the cells to the anode end plate. The power module 110 is situated in the housing 12 below the firebox 14. Any suitable power module 110 that provides unidirectional current can be used. A particularly preferred power module 110 is depicted in FIGS. 8, 9A, 9B and 9C.

Figure 8:
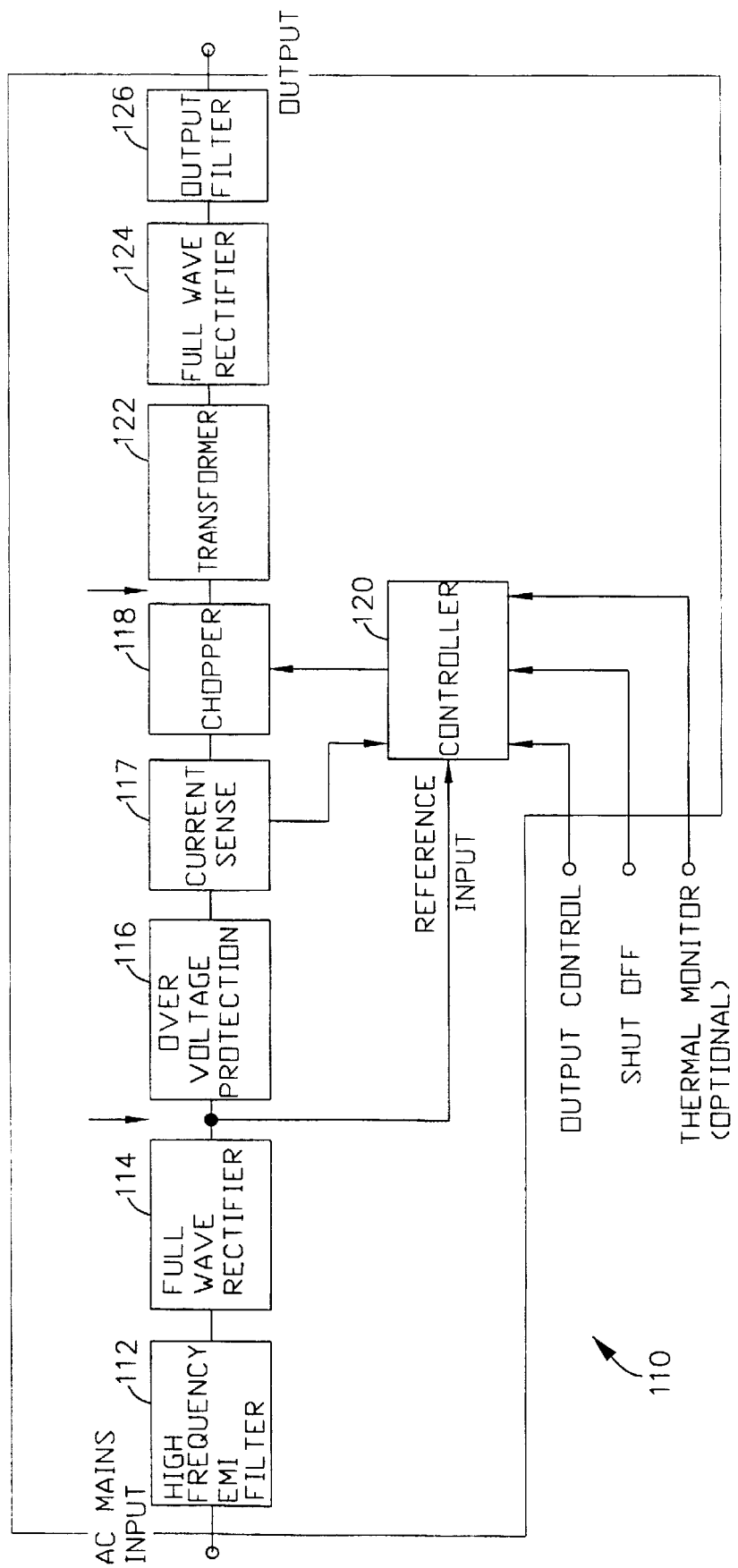
FIG. 8 is a flow chart depicting a preferred power source according to the present invention.

FIG. 8 illustrates a block diagram of a preferred embodiment of a power module 110. A standard AC input voltage of from about 220 VAC to 240 VAC at 50–60 Hz is applied to the input of a 2.5 KW power module 110 which produces a 16 volt rectified sinusoidal output at 167 amps. It will be appreciated that the power module 10 can be used with an AC input voltage of 115 VAC at 60 Hz single phase or 400 VAC three phase, with the proper interface elements if required. In addition, the output power can be varied by modifying or changing the internal components used to implement the power module, or alternatively by connecting multiple 2.5 KW power modules in parallel. Typically. four 2.5 KW power modules 110 will be connected in parallel to provide a 10 KW output to the electrolyzer used in connection with the hydrogen-fueled fireplace.

Figure 9A:
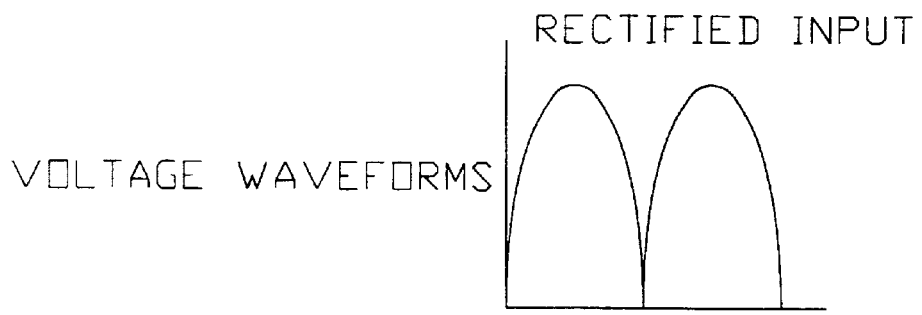
FIG. 9A is a timing diagram illustrating the voltage waveform at one stage in the power module.

The AC input voltage is applied to a EMI filter 112 at the front end of the power module 110. The EMI filter 112 is a high frequency cut-off filter which prevents unwanted frequencies from exiting the equipment. The filtered AC output from the EMI filter 112 is applied to a full-wave rectifier 114. The full-wave rectifier produces a rectified sinusoidal output as shown in FIG. 9A. An over-voltage protector 116, such as a SCR crowbar, may be connected at the output of the full-wave rectifier 114 to protect the power module 110 from large voltage excursions on the AC input line.

Figure 9B:
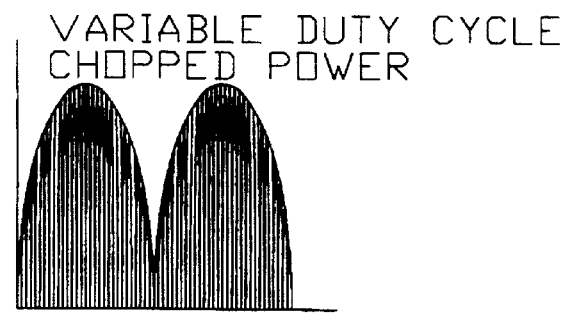
FIG. 9B is a timing diagram illustrating the voltage waveform at another stage in the power module.

The rectified sinusoidal output from the over-voltage protector 116 is applied through a current sense 117 to a chopper circuit 118. The chopper 118 is configured to provide a chopped output having a variable duty cycle as shown in FIG. 9B. The duty cycle of the chopper 118 is regulated by a controller 120 as a function of the rectified output from the full-wave rectifier 114. The current sense 117 is used to sense the current applied to the chopper 118. The current sense output is fed back to the controller 120 which, in cooperation with a reference input from the full-wave rectifier 114. controls the current delivered to the load by varying the duty cycle of the chopper output.

Figure 9C:
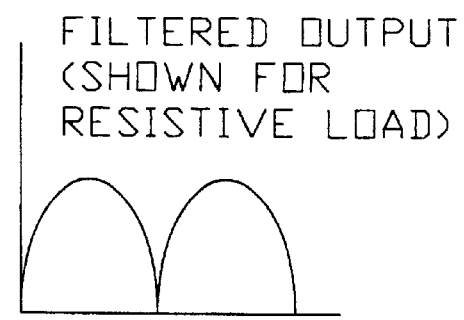
FIG. 9C is a timing diagram illustrating the voltage waveform at another stage in the power module.

The chopped output is applied to the primary windings (not shown) of a step-down transformer 122. The stepdowned voltage at the secondary windings (not shown) is applied to a full-wave rectifier 124 and filtered by an output filter 126 to produce a rectified sinusoidal voltage at the output of the power module, as shown in FIG. 9C for a resistive load. In the described embodiment, the load current is allowed to become essentially zero during each cycle of the AC input voltage when the output voltage of the power module 110 falls below the threshold voltage of the cells.

Preferably, the controller 120 has shut-off capability to protect the power module from overheating, or alternatively, from fault conditions in the load circuitry. If either of these conditions are detected by ancillary components, the controller 20 stops the output of the chopper 118 to prevent damage to the power module 110.

The ancillary components typically include a thermal sensor (not shown) which is connected to the thermal monitor input of the controller 20 to monitor the temperature of the power module 110 a fault detector (not shown) in the load circuitry provides a fault indicator signal to the shut off input of the controller 120. Additionally, external adjustment of the output voltage can be achieved through an output control input line. The output voltage of the power module 110 is adjusted by varying the duty cycle of the chopper output.

It is understood that the power modules can be used in a variety of applications in addition to that with the above-describe electrolyzer, including commercial battery chargers, power supplies for electroplating, and welding power supplies for TIG (tungsten inert gas)/MIG (metal inert gas) and arc welders, and the like. Likewise, the hydrogen-generating electrolyzer can be used in applications other than fireplaces. For example, the technology is useful for hot water heaters, cooking stoves, and any other gas appliances.

With reference to FIGS. 1 to 4 and 7, in the fireplace application described above, as hydrogen gas is produced in the cells 16, it is delivered to the burner 32 from the hydrogen settling tank 58 by means of a pipe (not shown). Oxygen gas is delivered to the inside of the firebox 14 at a location near the burner 32 from the oxygen settling tank 60 by means of another pipe (not shown). Of course, as would be recognized by one skilled in the art, the hydrogen and oxygen could be stored in intermediate tanks between the settling tanks and the firebox. Within the hydrogen pipe, preferably close to the burner 32, a non-return valve is provided to avoid possible oxygen flow through the pipe to the hydrogen settling tank 58 when the fireplace 10 is shut down. The rates that the hydrogen and oxygen are supplied to the firebox 14 through the hydrogen and oxygen supply pipes are controlled by the rates of generation of hydrogen and oxygen in the cells 16, which is controlled by adjusting the amount of power supplied from the power module 110 to the cells 16.

The hydrogen gas is burned in the firebox 14. Preferably, a small amount of electrolyte vapor is delivered to the burner 32 with the hydrogen gas, providing ions to color the flame. Initially, there is air in the firebox 14, but it is quickly used up by direct consumption and expelled by expansion, leaving an atmosphere of water vapor, hydrogen and oxygen in the firebox 14. Because the source of oxygen gas is substantially free of carbon and nitrogen, no nitrogen is present in the firebox to produce oxides of nitrogen and no carbon is present in the firebox to produce carbon monoxide or carbon dioxide. Thus, other than water formed by combustion of hydrogen gas and oxygen gas, the fireplaces 10 of the present invention have virtually zero emissions.

Additionally, because the flame is a hydrogen flame it does not produce soot like a normal natural or propane gas flame. A normal flame in a natural fireplace burns at the surface of the wood as the gases produced by the wood diffuse through the wood surface and ignite, making the wood glow on its surface. Natural gases cannot achieve this effect due to the build-up of soot caused by incomplete combustion if the gas is burned too close to the imitation logs. Burning of natural gas causes excessive carbon monoxide and can result in the fireplace not meeting the regulatory carbon monoxide limits. With a hydrogen flame, the flame can have intimate contact with the imitation logs, producing a much better glowing effect with a much more realistic appearance. The hydrogen flame does not produce soot or carbon monoxide, and hydrogen is so reactive that, as long as sufficient oxygen is present, incomplete combustion does not occur.

In another preferred embodiment. as shown in FIGS. 15 and 16, an adjustable burner assembly is provided for adjusting the size of the fire. The assembly 140 comprises a gas outlet pipe 142 having two ends and first and second sleeves 144 and 146 slidably mounted in surrounding relation on the ends of the gas outlet pipe. Each sleeve 144 and 146 has an open end 143 and a closed end 145. The gas outlet pipe 142 is connected to the hydrogen settling tank 58 by means of a pipe (not shown). The gas outlet pipe 142 contains a series of outlet holes 146 through which the hydrogen gas can flow.

The sleeves 144 and 146, when in a "closed" position, as shown in FIG. 15, cover the majority of the outlet holes 146, leaving exposed a small number of outlet holes in the center of the gas outlet pipe 142. Thus, gas can exit from only a limited number of outlet holes 146, creating a relatively small fire. The sleeves 144 and 146 can each be slid along the length of the outlet pipe 142 to uncover any desired number of outlet holes 146, as shown for example, in FIG. 16. As additional outlet holes 146 are exposed, the width of the fire increases.

Each sleeve 144 and 146 comprises at least one outlet hole 148 near its open end 143. Accordingly, gas is fed into the interior of each sleeve 144 and 146 as well as the gas outlet pipe 142. When the burner assembly is ignited, a flame is produced at the outlet holes 148 in the sleeves 144 and 146 as well as the outlet holes 146 in the gas outlet pipe 142. As the sleeves 144 and 146 are slid along the length of the gas outlet pipe 142, the flame at the outlet holes 148 in the sleeves assists in crosslighting the newly-exposed outlet holes 146 in the gas outlet pipe 142.

By the above design, a more attractive fire is provided. Normally, when a small gas is provided to the burner, a small fire is produced that is spread out over the length of the entire burner. The flame height is very small and tends to disappear behind the logs. In contrast, by the above design, one can achieve a small fire over a smaller width but with higher flames. Additionally, in traditional burners, widely separated parts of the burned have to be connected by a lightup train of small holes to ensure flam propagation. This wastes gas and reduces the overall flame height from a given amount of gas because the flames from the small holes are not visiable to the user. By the above design the small holes can be eliminated because cross-lighting is achieved, for example, by the outlet holes in the sleeves.

Figure 17:
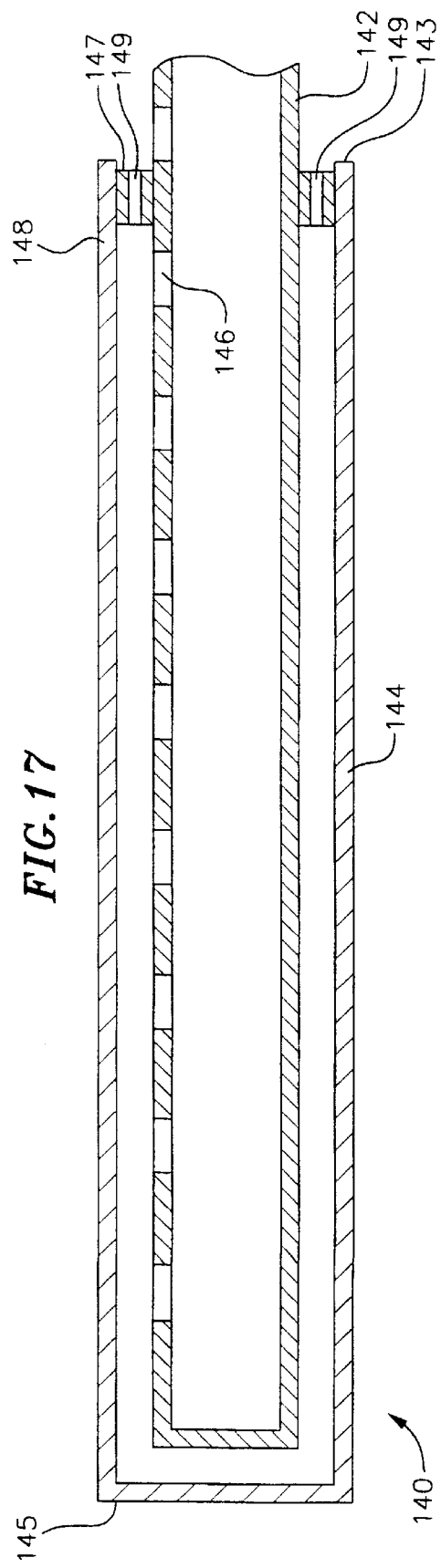
FIG. 17 is a side cross-sectional view of an alternate embodiment of a burner assembly according to the invention.

The embodiment described above can be modified as shown in FIG. 17. Between the sleeve 144 at its open end 143 and the gas outlet pipe 142 is provided a bearing 147. The bearing 147 contains a gas hole 149 through which gas can flow horizonatally relative to the veritcally-directed holes 146 of the gas outlet pipe 142. The gas hole 149 in the bearing 147 assists in cross-lighting in a manner similar to the outlet holes 148 in the sleeves described in the embodiment above.

Figure 14:
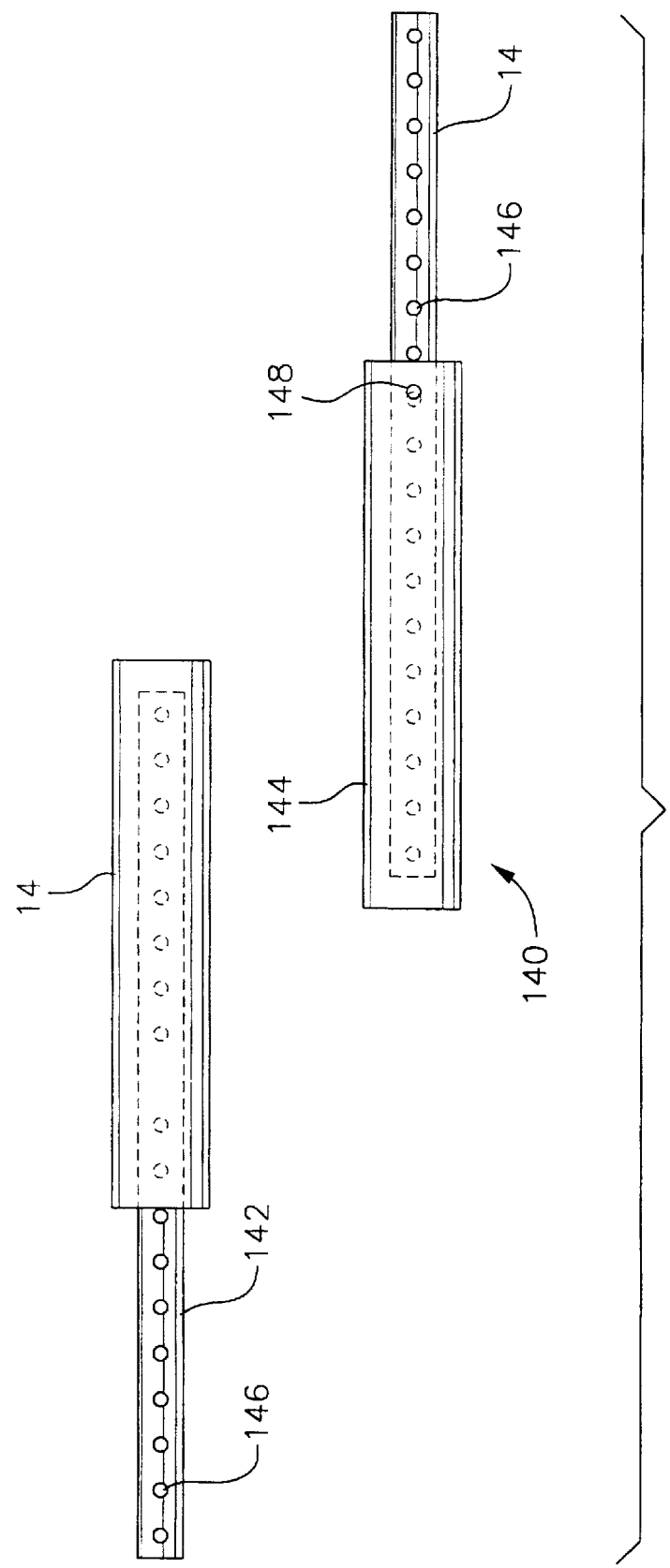
FIG. 14 is a side schematic view of a preferred burner assembly according to the invention.

Alternatively, a two-burner adjustable assembly 150 can be provided, as shown in FIG. 14. First and second gas outlet pipes 142 and 143 are provide in parallel displaced from each other a first sleeve 147 is slidably mounted in surrounding relation on the end of the first gas outlet pipe 142, and a second sleeve 148 is mounted in surrounding relation on the end of the second gas outlet pipe 143. This burner assembly performs in a manner similar to that described above, but has the advantage that the sleeves slide toward the center of the firebox rather than the sides of the firebox, providing more room for the sleeves to slide.

The water vapor produced in the firebox 14 rises into the top portion of the first plenum 34, and is cooled as it flows downwardly behind the firebox. A fan 40 is positioned in the bottom portion of the second plenum 36 below the firebox 14 and blows room air through the second plenum 36. As the water vapor flows downward and condenses in the first plenum 34, it heats the air rising in the second plenum 36, creating a heat exchanger effect. The heated air rises up through the second plenum 36 and out an opening 29 above the firebox 14, preferably directed in a downward direction so that the heat from this air seems to come from the flame produced at the burner 32. The fan 40 also blows air into the third plenum 38, which is situated behind the second plenum 36. The air in the third plenum 38 similarly rises and exits the housing 12 through grill 42. The air passing through the third plenum 38 cools the cells 16 of the electrolyzer 15. Preferably a flap or door (not shown) is provided at the entrance to the third plenum 38. The door is opened when the cell temperature reaches a predetermined value, e.g., 75° C. so that so that air does not pass into the third plenum to cool the cells until they reach the desired predetermined temperature. Thus, the temperature of the cells will have the opportunity to increase rapidly to the desired value before room air begins to cool the cells, allowing the cells to provide more gas (and therefore more flame) to the burner initially. The door may be made of a memory metal or bimetal which changes shape (i.e. moves from a closed to an open position) as the desired temperature is reached. Alternatively, the door may be opened and closed by a motor mechanism which is activated by an appropriate temperature sensor on the electrolyzer.

The reservoir tray 90 situated below the firebox 14 in the bottom portion of the first plenum collects the cooled water that passes through the rear portion of the first plenum 34. A pump 91 draws electrolyte solution 50 from the reservoir tray 90 and pumps make-up electrolyte solution 50 to the oxygen settling tank 60 through pipe 86. The pump 91 also sends a small amount of electrolyte solution 50 to one or more spray nozzles 98 in the rear portion of the first plenum 34. The spray nozzles 98 spray electrolyte solution 50 into the circulating exhaust, causing the water vapor in the exhaust to condense. If desired, steel wool (not shown) can be provided near the bottom of the first plenum 34, creating additional surface area on which the water vapor can condense. The level of the electrolyte solution 50 in the reservoir tray 90 is maintained by a valve (not shown) fluidly connected to a water reservoir 100. The water reservoir 100 is situated along the side of the firebox 14.

Recycling of water vapor only begins after the fireplace 10 has heated up initially, limiting any entrainment of material from the air that was initially in the firebox 14. By this design, no water vapor is exhausted into the room, and essentially only heat is produced. It is possible to make units in which the water vapor is allowed into the room, for example, if the fireplace is to be a combined heater/humidifier.

Although water is recycled, some top off is necessary periodically. This can be done by a small bore pipe (not shown) to the water reservoir 100 directly from the mains or by manual top off, in both cases by means of a deioniser.

Figure 4:
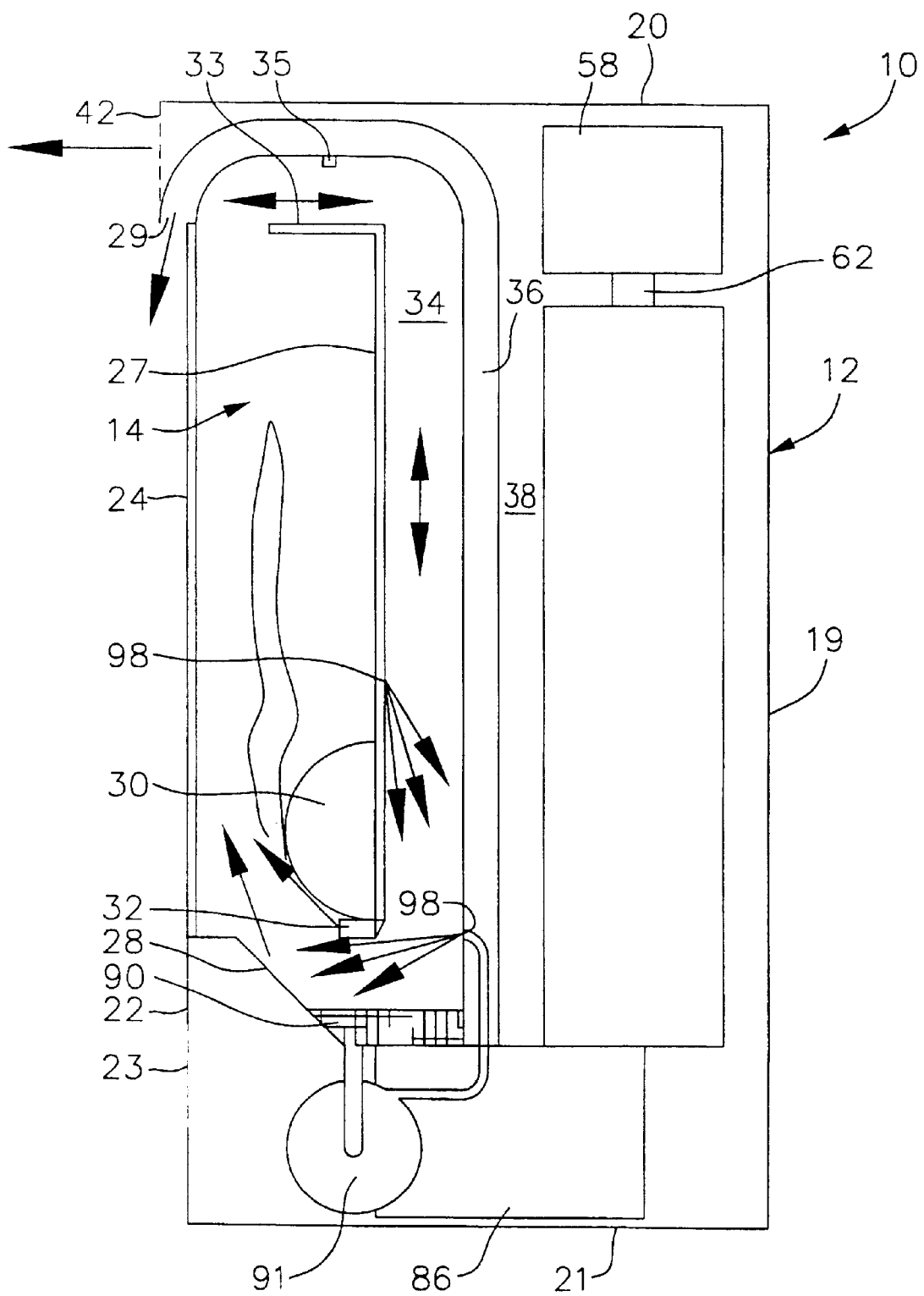
FIG. 4 is another side cross-sectional schematic view of a fireplace according to the invention.

In a preferred embodiment, as shown in FIG. 4, a tray 33 is provided in the top of the firebox 14. A water source 35 is provided above the tray 33 and drips water onto the tray. The tray which is heated by the fire, acts as an evaporator to create additional water vapor with the residue being left behind on the tray. This design eliminates the need for deionized make-up water.

Figure 10:
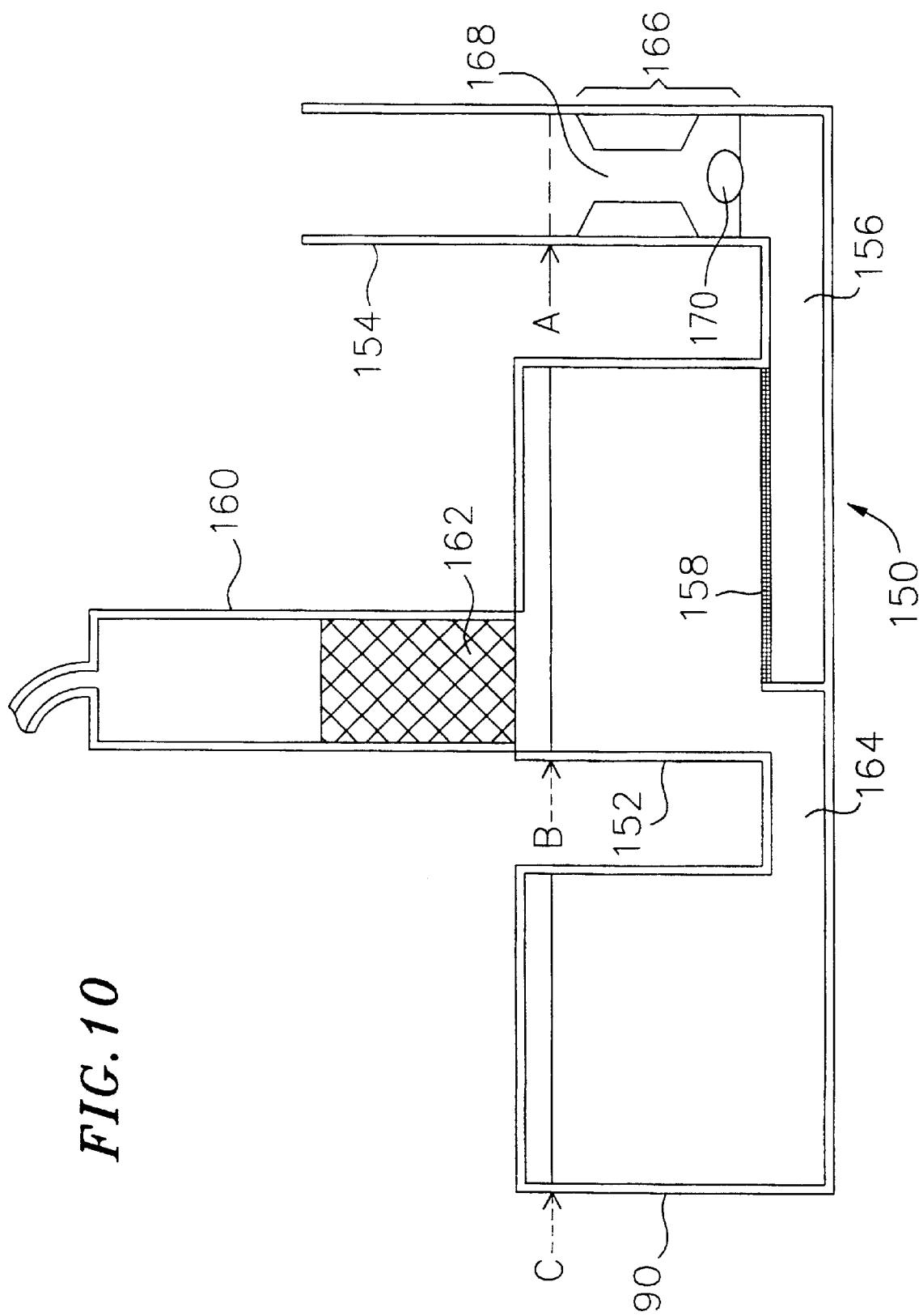
FIG. 10 is a side schematic view of a flashback arrestor system according to the invention.

Another aspect of the invention is a flashback arrestor system that also acts as a pressure control valve, as shown in FIG. 10. When used in combination with the above-described fireplace and electrolyzer, the flashback arrestor system 150 prevents an explosion in the firebox from passing into the electrolyzer. It further acts as a pressure control valve so that there is not a pressure differential within the electrolyzer.

The flashback arrestor system 150 comprises a primary chamber 152 and an input chamber 154. The input chamber 154 is fluidly connected to the hydrogen settling tank 58. Thus, gas and liquid from the hydrogen settling tank 58 enters the input chamber 154.

The bottom of the primary chamber 152 is connected to bottom of the input chamber 154 by passage 156. The primary chamber 152, input chamber 154 and passage 156 are positioned in a U-shaped arrangement so that the liquid in the system 150 is maintained at a level above the top of passage 156. Passage 156 extends into the bottom of primary chamber 152. A porous material 158 extends across the primary chamber 152 in such a manner that any gas passing through the primary chamber must pass through the porous material. As used herein the term porous material is intended to mean a material that is capable of breaking the gas into smaller non-connecting bubbles as the gas passes from the passage 156 into the primary chamber 152. Preferably the porous material 158 is fabric, such as woven polypropylene, or stainless steel mesh. Also, the porous material 158 must be capable of withstanding the temperature and the aggressive fluid pressure of the system 150.

The pressure of the system will be the same at point A and point B. Point B represents the level of liquid in the primary chamber 152. Thus, the pressure is controlled in the flashback arrestor system so that the membranes 48 within the cells 16 do not have to be able to withstand a pressure differential.

The primary chamber 152 is fluidly connected to the burner 32 in the firebox 14. Because the porous material 158 breaks up the gas within the primary chamber 152, there is no risk of an explosion progressing from the firebox 14 back into the electrolytic cells 16.

In the depicted embodiment, a riser 160 is mounted on the top of the primary chamber 152. The riser 160 is a precautionary measure in the event that there is some liquid carryover with the hydrogen gas going to the burner 32 from the primary chamber 152. Cool water is introduced into the top of the riser 160 to condense any water vapor that enters the riser. Packing 162, such as steel wool, is provided in the riser 160 so that water vapor that enters the riser condenses in the packing.

In the depicted embodiment, the primary chamber 152 is also fluidly connected to the reservoir tray 90 by second passage 164. The pressure at point C in the reservoir tray 90 is the same as at points A and B.

A non-return valve mechanism 166 is provided in the input chamber 154. The non-return valve mechanism comprises a narrowed region 168 and a floater 170. The narrowed region 168 has a cross-sectional area larger than that of the input chamber 164. The floater 170 has a size smaller than the cross-sectional area of the input chamber 164, but larger than the cross-sectional area of the narrowed region 168. The system is designed so that the liquid level in the input chamber 154 is typically sufficiently below the narrowed region 168 such that the top floater is maintained below the narrowed region 168. When the fireplace 10 is shut down, the liquid level in the input chamber 164 rises, forcing the floater 170 upward to block the narrowed region 168. Thus, the non-return valve prevents possible gas flow (including oxygen gas) from the firebox 14 back into to the hydrogen settling tank 58 when the fireplace 10 is shut down.

A similar flashback arrestor system is provided for the oxygen settling tank. As would be recognized by one skilled in the art, the flashback arrestor system described herein is also useful in connection with apparatuses other than fireplaces and electrolyzers, where flashback control and/or pressure control is desirable.

The fireplace, electrolyzer, power module, and flashback arrester can all be controlled and/or monitored using a remote control. A control panel is provided in the housing, for example behind the bottom grill. Using the remote control and control panel, one can, for example, detect a hydrogen gas leak. The power module(s) can be turned on and off, thus controlling the electrolyzer and ultimately the fire. The control panel can also control the fan, pump and ignition. A flame failure mechanism can be provided whereby the power module is turned off if the gas does not ignite. The fluid levels in the electrolyzer and reservoir can be monitored so that, if they get too low, the system can be shut down or more water added. Additionally, the control panel can be used to monitor the position of the non-return valve float and turn on the electrolyzer for a brief period if the float is too high. A thermostat can also be provided for controlling the room temperature.

The preceding description has been presented with reference to presently preferred embodiments of the invention. Workers skilled in the art and technology to which this invention pertains will appreciate that alterations and changes in the described structure may be practiced with out meaningfully departing from the principal, spirit and scope of this invention.

For example, the size, number and arrangement of plenums in the fireplace may be changed as desired. As but one illustration, the heat generated in the fireplace can be vented to the outdoor atmosphere, by a chimney or duct which extends through an exterior wall or ceiling, rather than into the room. While it is preferred to have a water vapor condensing system to recover and reuse the water vapor formed by the combustion of hydrogen and oxygen gas, it is understood that the water vapor may also be vented to the outdoor atmosphere or to the room as desired. It is also understood that the location and arrangement of the various components, including the electrolyzer, power supply and control panel is, in large respect, a matter of choice and may be changed as desired. As but one additional example, in the electrolyzer the electrolyte solution could return from the settling tanks through the gas flowpipes.

Accordingly, the foregoing description should not be read as pertaining only to the precise structures described and illustrated in the accompanying drawings, but rather should be read consistent with and as support to the following claims which are to have their fullest and fair scope.

What is claimed is:

1. A self-contained power module comprising an enclosure having input and output connectors for providing an electrical interface between an exterior and interior of the enclosure, said module comprising:
    a first full-wave rectifier having an input connected to the input connector of the enclosure, and an output,
    a chopper having an input connected to the first full-wave rectifier output, and a chopped output having a variable duty cycle,
    a transformer having a primary winding coupled to the chopped output, and a secondary winding;
    a second full-wave rectifier having an input coupled to the secondary winding of the transformer, and an output connected to the output connector of the enclosure such that a rectified sinusoidal waveform appears at the output connector when an AC voltage is applied to the input connector; and
    a controller for regulating the duty cycle of the chopped output as a function of the AC voltage.

2. The power module of claim 1 wherein the power supply further comprises an EMI filter disposed between the AC voltage and the first full-wave rectifier input, an overvoltage protector connected to the first full-wave rectifier output, and an output filter for passing the rectified sinusoidal waveform from the second full-wave rectifier output to the electrolyzer.

3. The power module of claim 1 wherein the power supply further comprises a current sense disposed between the first full-wave rectifier output and the chopper input said controller having inputs connected respectively to the first full-wave rectifier output and the current sense, and an output connected to the chopper for regulating the duty cycle of the chopped output.

4. A filter-press electrolyzer system comprising:
    an electrolyzer having a series of between about 5 and 30 cells capable of producing hydrogen gas and oxygen gas from an electrolyte solution; and
    a switch mode power supply electrically connected to the electrolyzer.

5. The power module of claim 1, wherein said transformer comprises a step-down transformer.

6. A filter-press electrolyzer comprising:
    (a) a series of cells capable of producing hydrogen gas and oxygen gas from an electrolyte solution, wherein each cell comprises:
        (i) a cathode , olate capable of generating hydrogen gas from the electrolyte solution,
        (ii) an anode plate capable of generating oxygen gas from the electrolyte solution spaced apart from the cathode plate,
        (iii) a hydrogen and oxygen gas impermeable membrane spaced between the cathode plate and anode plate,
        (iv) a first gasket adjacent the periphery of the cathode plate between the cathode plate and the membrane, and
        (v) a second gasket adjacent the periphery of the anode plate between the anode plate and the membrane;
    (b) a hydrogen settling tank; and
    (c) an oxygen settling tank;
        wherein each of the cathode plate, anode plate, membrane, first gasket and second gasket contains a series of hydrogen gas holes to form a separate hydrogen gas flowpath for each cell that extends through the series of cells to the hydrogen settling tank, and
        further wherein each of the cathode plate, anode plate, membrane, first gasket and second gasket contains a series of oxygen gas holes to form a separate oxygen gas flowpath for each cell that extends through the series of cells to the oxygen settling tanks.

7. An electrolyzer according to claim 6, wherein each cathode plate and each anode plate is modified to increase its surface area.

8. An electrolyzer according to claim 7, wherein the surface of each cathode plate and each anode comprises a plurality of swaged or cut grooves.

9. An electrolyzer according to claim 6, wherein each membrane comprises a porous polyolefin.

10. An electrolyzer according to claim 9, wherein each membrane is treated to be at least partially hydrophilic.

11. An electrolyzer according to claim 6, wherein the electrolyte solution comprises a surfactant.

12. The electrolyzer according to claim 6 wherein each of said hydrogen gas flowpaths is covered, at least in part, by an insulating material and each of said oxygen gas flowpaths is covered, at least in part, by an insulating material; and further wherein each of the cathode plate, anode plate, membrane, first gasket and second gasket contains at least one electrolyte return hole to form at least one electrolyte return flowpath that extends through the series of cells, wherein each of said at least one electrolyte return flowpaths is covered, at least in part, by an insulating material.

13. An electrolyzer according to claim 6, wherein at least one cathode plate of one cell also acts an the anode plate of an adjacent cell.

14. A hydrogen-fueled fireplace comprising:

a firebox;

a burner assembly within the firebox; and means for generating hydrogen gas and for directing generated hydrogen gas to the burner comprising an electrolyzer according to claim 1, whereby burning the hydrogen gas in the firebox in the presence of oxygen produces a flame.

15. A hydrogen-fueled fireplace according to claim 14, further comprising means for introducing oxygen gas from the electrolyzer into the firebox at a location adjacent to the burner.

16. A hydrogen-fueled fireplace according to claim 1, wherein the front of the firebox comprises a glass wall.

17. A hydrogen-fueled fireplace according to claim 1, wherein the introduction of air into the firebox is substantially eliminated.

18. A hydrogen-fueled fireplace according to claim 1, comprising:

a first plenum having a top portion fluidly connected with and extending above the firebox, a rear portion extending behind the firebox and a bottom portion extending below the firebox, and a reservoir located at the bottom portion of the first plenum.

19. A hydrogen-fueled fireplace according to claim 18, further comprising a second plenum having a top portion above the firebox and top portion of the first plenum, a rear portion located behind the firebox and rear portion of the first plenum and a bottom portion below the firebox and bottom portion of the first plenum. the top and bottom portions of the second plenum being fluidly connected to room air on outside of the firebox, whereby room air from outside the firebox passes into the bottom portion of the second plenum, up through the rear portion of the second plenum, and out of the top portion ofthe second plenum at a temperature greater than that at which it entered the bottom portion of second plenum.

20. A hydrogen-fueled fireplace according to claim 2, wherein at least a portion of the water vapor produced by the burning of hydrogen in the presence of oxygen is discharged from the firebox into a room in which the fireplace is located.

21. A hydrogen-fueled fireplace according to claim 19, further comprising means for directing air exiting the fireplace from the top portion of the second plenum in a generally downward direction.

22. A hydrogen-fueled fireplace according to claim 1, comprising at least one imitation log within the firebox.

23. A hydrogen-fueled fireplace according to claim 1, wherein the firebox is contained within a housing and further wherein the electrolyzer is contained, at least in part, in the housing.

24. A hydrogen-fueled fireplace according to claim 1, wherein the electrolyzer comprises from 5 to 15 cells.

25. A hydrogen-fueled fireplace according to claim 1, wherein the electrolyte solution comprises ions that affect the color of the flame produced when the hydrogen gas is burned.

* * * * *